United States Patent [19]

Kruyer

[11] Patent Number: 4,740,311
[45] Date of Patent: Apr. 26, 1988

[54] SEPARATING OIL PHASE FROM AQUEOUS PHASE USING AN APERTURED OLEOPHILIC SIEVE IN CONTACT WITH AN APERTURED CYLINDRICAL CAGE WALL

[76] Inventor: Jan Kruyer, 4643 82nd Ave., Edmonton, Alberta, Canada, T6B 2L9

[21] Appl. No.: 511,773

[22] Filed: Jul. 6, 1983

[51] Int. Cl.$^4$ ............................................. B01D 33/04
[52] U.S. Cl. .................................. 210/669; 210/799; 210/401
[58] Field of Search ............... 210/262, 283, 924, 669, 210/799, 693, 297, 401, DIG. 5; 208/11 LE; 209/5, 17

[56] References Cited

U.S. PATENT DOCUMENTS

| | | | |
|---|---|---|---|
| 3,915,859 | 10/1975 | Sundin et al. | 210/783 X |
| 4,165,282 | 8/1979 | Bennett et al. | 210/924 X |
| 4,236,995 | 12/1980 | Kruyer | 209/17 X |
| 4,406,793 | 9/1983 | Kruyer | 210/669 |

Primary Examiner—Frank Spear
Attorney, Agent, or Firm—Thorpe, North & Western

[57] ABSTRACT

A mixture containing a viscous oil phase and an aqueous phase is separated by means of an apertured oleophilic endless sieve supported in a separation zone by a revolving cylindrical cage having apertured sidewalls and supported in a recovery zone by a support roller, each section of sieve surface alternately revolves through the separation zone and recovery zone. The mixture is introduced into the rotating cage in the separation zone. The endless sieve partly covers the outside surface of the cylindrical cage sidewall. The mixture tumbles inside of the cage and passes through the cage sidewall apertures to the sieve surface. The oil phase of the mixture is captured by the sieve upon contact and is conveyed out of the separation zone.

In the recovery zone, oil phase is removed from the sieve by squeezing the oil phase on the sieve between two rollers at least one of which is oleophilic. Alternately, the oil phase on the sieve may be heated and, because of its apertured surface, be blown off, shaken off or thrown off the sieve under the influence of an applied force.

56 Claims, 7 Drawing Sheets

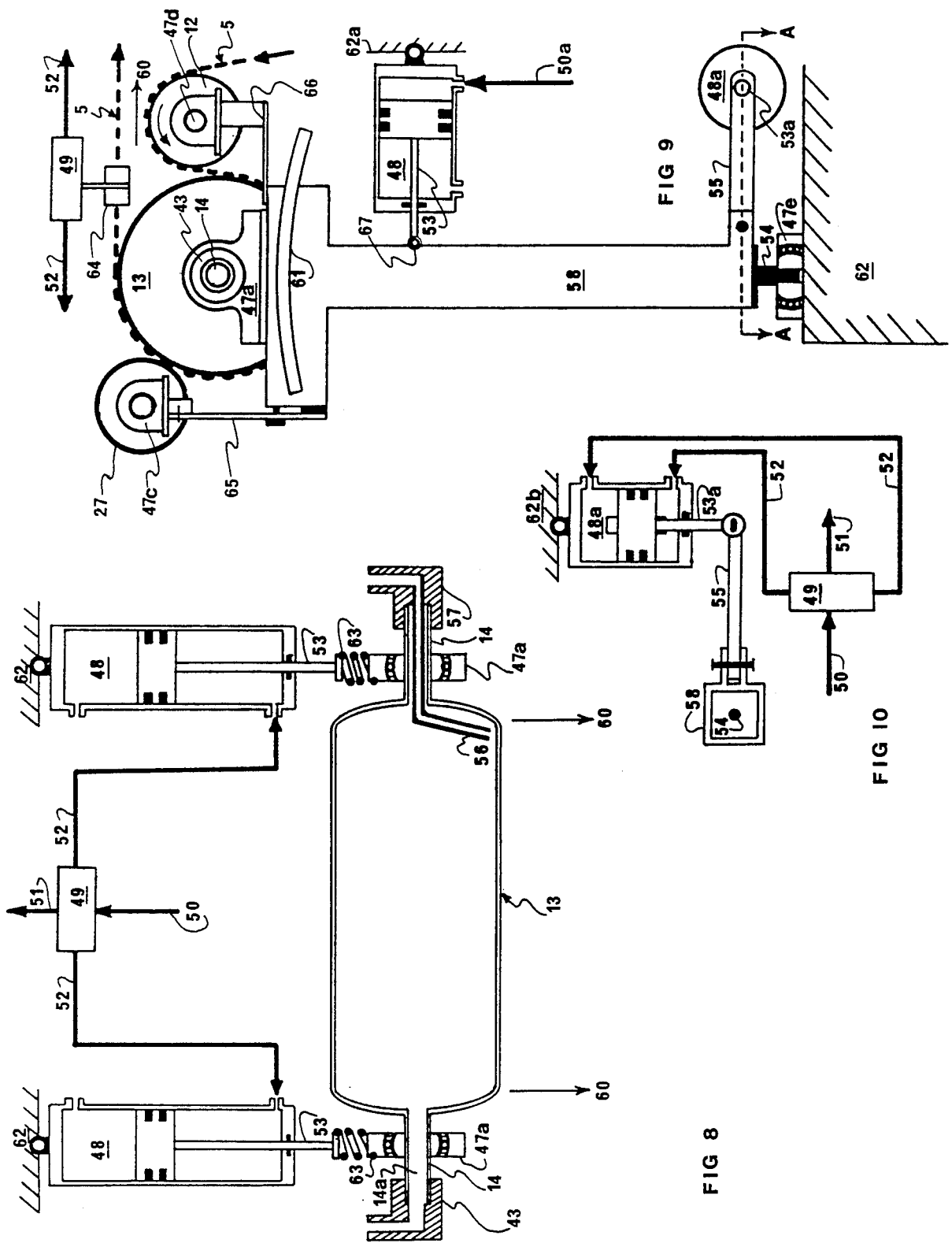

SEPARATING OIL PHASE FROM AQUEOUS PHASE USING AN APERTURED OLEOPHILIC SIEVE IN CONTACT WITH AN APERTURED CYLINDRICAL CAGE WALL

BACKGROUND OF THE INVENTION

The present invention relates to the use of an apertured oleophilic endless sieve wrapped around the cylindrical apertured wall of a rotating cage to separate a mixture of oil phase and aqueous phase in a separation zone. More particularly, this invention relates to a process wherein both phases tumble in the cage, pass through the apertured cylindrical cage wall to the surface of the apertured oleophilic endless sieve where aqueous phase, which may include hydrophilic solids in particulate form, passes through the sieve apertures and oil phase is captured upon contact by the surface of the apertured oleophilic endless sieve in a separation zone. The sieve and cage revolve continuously such that the captured oil phase is continuously carried by the endless sieve into a recovery zone where the oil is removed from the sieve. Separation in the separation zone generally is carried out at a relatively lower temperature and removal of oil phase in the recovery zone generally is carried out at a relatively higher temperature to take advantage of the stickiness of the oil phase at relatively lower temperatures and the fluidity of the oil phase at relatively higher temperatures. The actual temperatures used are selected largely according to the properties of the oil phase.

This invention is concerned with recovering bitumen from mined oil sand (tar sand), from oil sand tailings, middlings and sludge ponds and for the recovery of oil phase from oil field sludges, oil-sand-water mixtures, emulsions, heavy oil and water mixtures and the like. Extensive deposits of oil sands, which are also known as tar sands and bituminous sands, are found in Northern Alberta, Canada. The sands are composed of silicious material with grains generally having a size greater than that passing a 325 mesh screen (44 microns) and a relatively heavy, viscous petroleum called bitumen, which fills the void between the grains in quantities of from 1 to 21 percent of total composition. (All percentages referred to herein are in weight percent unless noted otherwise.) Generally, the bitumen content of the sand is between 5 and 15 percent. This bitumen contains typically 4.5 percent sulfur and 38 percent aromatics. Its specific gravity at 16° C. ranges from about 1.00 to about 1.06. The oil sands also contain clay and silt. Silt is defined as silicious material which will pass a 325 mesh screen (45 microns), but which is larger than 2 microns. Clay is material smaller than 2 microns, including some siliceous material of that size. Extensive oil sands deposits are also found elsewhere in the world, such as in the Orinoco heavy oil belt of Venezuela, in many of the African countries, in Russia and in the state of Utah. The mineral and bitumen of these deposits vary from place to place. For example, compared with the Alberta oil sands, the Utah tar sands contain a coarser sand, less clay, less water and an even more viscous bitumen.

Much of the world resource of bitumen and heavy oil is deeply buried by overburden. For example, it has been estimated that only about 10 percent of the Alberta oil sand deposit is close enough to the earth's surface to be conveniently recovered by mining. The remainder is buried too deeply to be economically surface mined. Hydraulic mining or tunnel mining has been proposed for these deeper deposits. Generally, however, it is considered that enhanced recovery by steam injection, by injection of aqueous solutions, and/or by in-situ combustion may possibly be more effective for obtaining bitumen or heavy oil from deeply buried formations. Such enhanced recovery methods use one or more oil wells that penetrate the formation and stimulate or recover the resource. Recovery of bitumen from a well by steam stimulation, for example, is described in Canadian Patent No. 822,985 granted on Sept. 16, 1969 to Fred D. Muggee. Depending upon the procedure employed, enhanced recovery methods either produce mixtures of oil and water, water in oil emulsions or produce oil in water emulsions.

There are several well known procedures for separating bitumen from mined oil sands. One such method is known as the "Hot Water Process." In a hot water method, such as disclosed in Canadian Patent No. 841,581 issued May 12, 1979 to Paul H. Floyd et al, the bituminous sands are jetted with steam and mulled with a minor amount of hot water and sodium hydroxide in a conditioning drum to produce a pulp which passes from the conditioning drum through a screen, which removes debris, rocks and oversize lumps, to a sump where it is diluted with additional water. It is thereafter carried into a separation cell.

In the separation cell, sand settles to the bottom as tailings which are discarded. Bitumen rises to the top of the cell in the form of a bituminous froth which is called the primary froth product. An aqueous middlings layer containing some mineral and bitumen is formed between these layers. A scavenging step is normally conducted on this middlings layer in a separate flotation zone. In this scavenging step, the middlings are aerated so as to produce a scavenger tailings product which is discarded and a scavenger froth product. The scavenger froth product is thereafter treated to remove some of its high water and mineral matter content and is thereafter combined with the primary froth product for further treatment. This combined froth product typically contains about 52 percent bitumen, 6 percent mineral matter, 41 percent water, all by weight, and may contain from 20 to 70 volume percent air. It resembles a liquid foam that is difficult to pump and, for that reason, is usually treated with steam to improve its flow characteristics.

The high water and mineral contents of the combined froth product normally are reduced by diluting it with a hydrocarbon diluent such as naphtha. It is then centrifuged to produce a tailings product and a final bitumen product that typically contains essentially no water and about 1.3 percent solids and that is suitable for coking, hydrovisbreaking and other refining techniques for producing a synthetic crude oil. The tailings products, containing some naphtha, are discarded.

There are basically four effluent streams from the Hot Water Process. Each carries with it some of the bitumen of the feed; thereby reducing the efficiency of the Process. These include the oversize material, the sand from the separation cells, the silt and clay from the scavenger cells and the tailings from the centrifuges. Up to 30 percent of the bitumen in the original feed and up to 5 percent of the naphtha stream may be lost in this manner. Much of this bitumen effluent finds its way into large retention ponds that are typical of the Hot Water Process. The bottom of such retention ponds may contain up to 50 percent dispersed mineral matter substantially of clay and silt as well as 2 to 10 percent bitumen. As disclosed in Canadian Patent No. 975,697 issued on Oct. 7, 1975 to Davitt H. James, this part of the pond contents, referred to as sludge, is a potential source of bitumen.

The Hot Water Process described in the preceding paragraphs separates bitumen from a slurry prepared from mined oil sand. The slurry is hot, contains finely dispersed air bubbles and the bitumen is in the form of small flecks. Such a slurry is amenable to subsequent separation in the hot water bath, after dilution, wherein bitumen forms into a froth that rises to the top of the bath and is skimmed therefrom. Alkaline reagents such as sodium hydroxide are normally added in this process to give the slurry those properties that provide for efficient flotation of the bitumen in said water bath. However, in the presence of sodium hydroxide, fine clay particles in the effluent streams from this process do not settle readily. For this reason inordinately large settling ponds are required to contain the effluents from commercial hot water oil sands extraction plants.

When bitumen or heavy oil is produced from deeper formations, such as by steam stimulation or by in-situ combustion, the oil produced at the production wells is a mixture with water in emulsified form that may vary in composition from 1 to 99 percent oil. Some of these emulsions readily separate, but other emulsions are extremely stable and very difficult to break. Separation by gravity becomes particularly difficult to achieve when the oil (bitumen) of these mixtures has a specific gravity approximating that of water, i.e., close to 1.00. Quite often a chemical demulsifier and a diluent are added to break and separate these emulsions. The demulsifier conditions the emulsion so that it can be separated and the diluent acts to dissolve the suspended oil of the emulsion and make the combined oil phase light enough so that it can be separated by floating the oil off the top of the water phase. Treaters are used quite often to speed up the separation process. Such treaters may be in the form of coalescers where the diluted emulsion is made to flow through a packed bed or through a sponge to enhance subsequent gravity separation or in the form of electrical precipitators. Treater operation becomes difficult when the emulsions contain particulate solids such as sand, silt or clay. These solids tend to form pads in the treaters which interfere with the emulsion separation process. Such pads periodically must be flushed out of the treaters to adjacent desand pits where the solids are allowed to settle and part of the fluid is pumped back into the treater. The resultant solids, oil and water mixture are removed by vacuum trucks and/or back hoes and are disposed off by spreading it on gravel and dirt roads in the vicinity to keep down the dust. However, the amount of discard oil that needs to be disposed off in this manner is becoming much in excess of the requirements of the roads in the area and other uses must soon be found or improvements in technology are required to prevent the production of such effluents and to make more effective use of the available oil.

Not only does current emulsion separation technology suffer from operational difficulties when separating emulsions that contain particulate solids, but also the requirements of large amounts of diluents for the separation and the attendant loss of diluent with the effluents is a problem of economics and environmental pollution.

The present invention applies to processes that get away from the gravity separation of the prior art and utilizes apertured oleophilic endless conveyor sieves to achieve slurry and/or emulsion separations. The present invention is an improvement on certain related processes utilizing an apertured oleophilic drum or belt for oil phase separation that are disclosed in the inventor's U.S. Pat. Nos. 4,224,138; 4,236,995; 4,392,949; 4,405,446; 4,635,860 and 4,511,461, which are discussed further on in these specifications to describe the improvements claimed herein.

OBJECTS OF THE INVENTION

An object of the present invention is to evenly distribute a mixture of oil phase and aqueous phase over the width of large apertured oleophilic endless sieves for oil phase separation by the sieves.

Another object of the present invention is to distribute oil phase and aqueous phase mixtures onto an oleophilic sieve with minimum disturbance and with minimum turbulence so as to maximize oil phase particle size in the mixture and to minimize the break up of oil phase particles as these particles contact the surface of an apertured oleophilic sieve.

A different object of the present invention is to permit immersion of part of an apertured oleophilic endless sieve in a separation zone in a water bath without having to immerse shafts, bearings or other mechanical parts in the bath liquid.

Still another object of the present invention is to combine in one apparatus a process of oil phase agglomeration by means of oleophilic free bodies in a rotating cage and a process of separating oil phase from aqueous phase by means of an apertured oleophilic endless sieve in such a manner that the agglomerated oil phase particles will not be broken up while being transferred from the cage to the apertured oleophilic endless sieve for separation.

A further object of the present invention is to achieve separation of oil phase from aqueous phase at relatively low temperatures to take full advantage of the stickiness of oil at lower temperatures and to minimize the input of thermal energy into the mixture to achieve separation.

An additional object of the present invention is to achieve effective removal of oil phase from an apertured oleophilic sieve in a recovery zone, either by squeezing the oil phase on the sieve between at least two rollers so that excess oil phase, which cannot pass the nip between the rollers, is squeezed off the sieve surface or by significantly heating the oil phase on the sieve so that the oil phase will readily flow and leave the sieve surface by squeezing, by shaking, by centrifugal force or by transfer to the surface of a roller which is scraped by a doctor blade.

Another different object of the present invention is to remove adhering aqueous phase out of the apertures and from the surface of an apertured oleophilic endless sieve prior to oil phase removal by deflecting the sieve with an oleophilic roller which contains oil phase on its surface which oil phase revolves with the roller surface and pushes aqueous phase out of the sieve apertures.

Another additional object of the present invention is to remove adhering aqueous phase out of the apertures and from the surface of an apertured oleophilic endless sieve prior to oil phase removal by deflecting the sieve with a small diameter roller which imposes locally a high centrifugal force at the area of inflection which throws off the aqueous phase, but which leaves the oil phase on the sieve surface because of its stickiness and higher viscosity.

A yet other object of the present invention is to remove adhering aqueous phase out of the apertures and from the surface of the apertured oleophilic endless sieve prior to oil phase removal by impacting the sieve with a jet of air which blows aqueous phase out of the sieve apertures, but which leaves oil phase on the sieve surfaces because of its stickiness and higher viscosity.

These and other objects may be accomplished by means of the invention as detailed in the following description.

BRIEF DESCRIPTION OF THE INVENTION

In accordance with the broadest concepts of the present invention, a mixture of viscous oil phase and aqueous phase is tumbled in a rotating cage that has an apertured cylindrical wall. The mixture continuously passes through the apertures in this wall to the surface of an apertured oleophilic endless sieve in contact with the cylindrical cage wall such that the aqueous phase passes through the sieve apertures and is removed and the viscous oil phase is captured upon contact by the oleophilic surfaces of the sieve in a zone called the "separation zone". The sieve and cage rotate continuously and the oil phase, captured by the sieve surfaces, is carried out of the separation zone due to the movement of the cage and sieve into a "recovery zone" where the oil phase is removed from the sieve surfaces to become the oil phase product of the process. Due to the sieve and cage revolutions, each sieve section continuously passes sequentially through the separation zone, the recovery zone and back to the separation zone, etc. Tumbling of the mixture in the rotative cage achieves effective distribution of the mixture over the full width of the sieve, may also serve to gather the oil phase in larger particles and serves to transfer the mixture to the sieve surface with minimal turbulence and without breaking up the oil phase particles before they contact the sieve surface. In some cases a charge of oleophilic free bodies, such as spheres or long rods or pipes, that are larger in diameter than the sieve apertures so that they remain in the cage at all times, helps to gather the oil phase into larger particles during the tumbling which oil phase particles then pass through the apertures in the cage wall and adhere to the surfaces of the endless sieve for removal out of the separation zone and for subsequent removal from the sieve surfaces in the recovery zone. The cage may be partly immersed in a water bath for separating most mixtures to reduce the flow velocity through the cage apertures to further minimize turbulence at the cage and sieve interface and to improve contact between oil phase particles and the surfaces of the sieve. The cage may be in the form of a drum or grizzly, or any other type of cage which will have solid endwalls.

In the preferred embodiment, the mixture is separated in the separation zone at a relatively cool temperature to take full advantage of the stickiness of oil phase at cooler temperatures, but is removed from the sieve surfaces in the recovery zone at a relatively higher temperature to take advantage of the fluidity, mobility and reduced stickiness of oil at higher temperatures. Heating of the sieve contents in the recovery zone is achieved by heating the conveyor roller supporting the sieve and/or one or more of the other rollers in contact with the sieve or by live steam or hot gas jetting the sieve or surrounding the sieve in the recovery zone.

In a second embodiment, the mixture is separated in the separation zone and removed from the sieve in the recovery zone with lower heat input to the recovery zone. The oil phase is removed from the sieve by squeezing the oil phase on the sieve between at least two rollers such that excess oil that cannot pass between the rollers is pushed off the sieve. The fact that the sieve is apertured makes it practicable to remove oil phase from the sieve in this manner, and these rollers pull oil phase out of the sieve apertures for recovery.

DRAWINGS

FIG. 8 is a cross sectional view of a sieve tensioning and tracking means that may be used for the systems shown in FIGS. 1 or 4.

FIG. 9 is a cross sectional view of a sieve tensioning and tracking means that may be used with the systems shown in FIGS. 2 or 3.

FIG. 10 is a cross sectional view taken through section A—A of FIG. 9 to show vertical frame rotation control means in more detail.

DETAILED DESCRIPTION OF THE INVENTION

Figure 1:
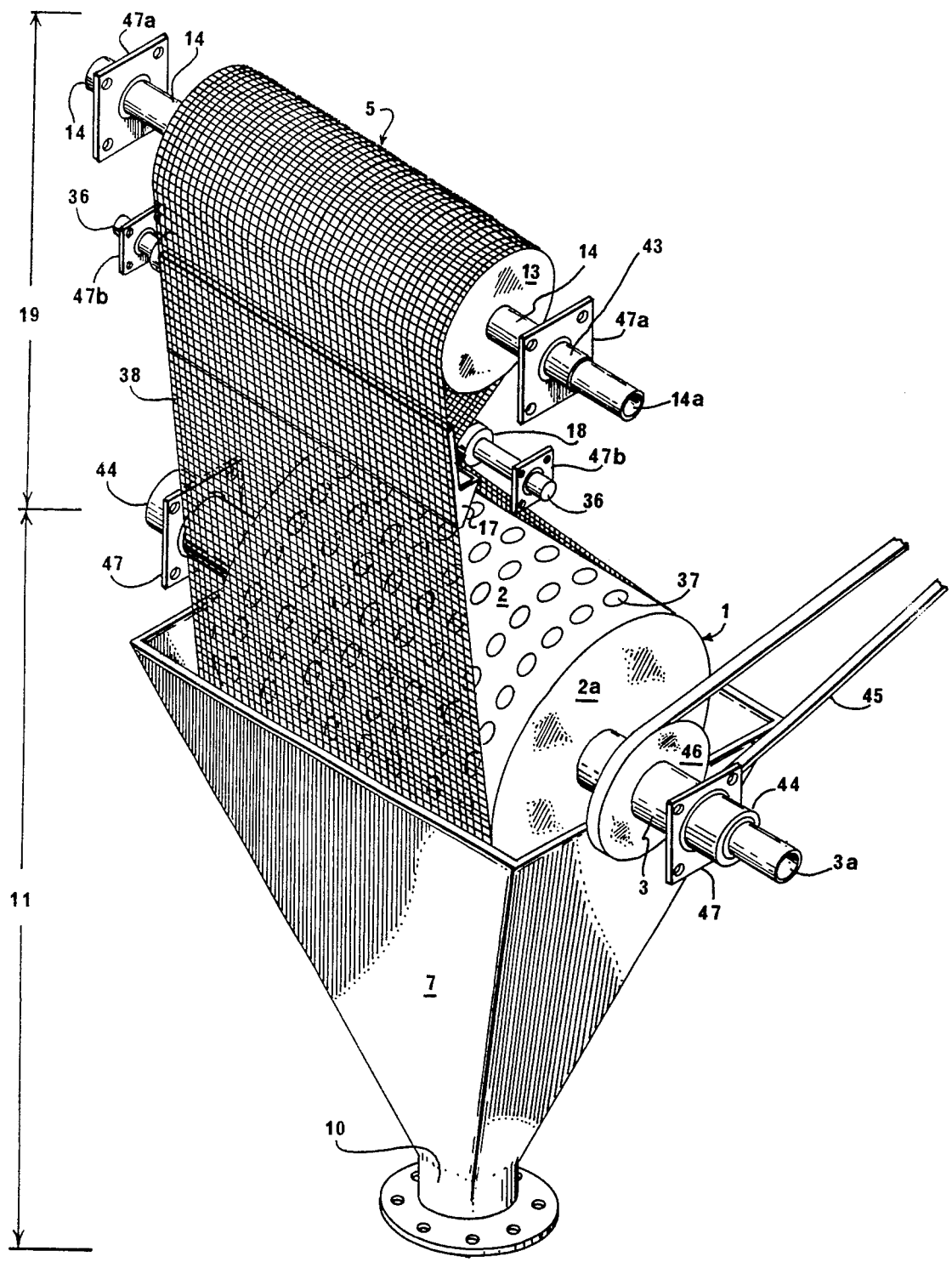
FIG. 1 is a perspective view of one system of the invention used to practice one method of the invention showing a tumbling drum, a separation sieve, a recovery means and a bath.

For the purposes of the invention, "mixture" may refer to oil (tar) sand slurry, oil sand tailings, oil sand middlings, tailings pond sludge, oil and water emulsions, in situ produced oil and water mixtures, treater sludges, oil spill materials and any other type of mixtures that contain (1) oil, water and particulate solids, (2) bitumen, water and solids, (3) oil and water, (4) bitumen and water, (5) shale oil and water and any other mixtures of liquid hydrocarbon phase and aqueous phase, with or without solids contained in them.

As used herein "oleophilic" refers to those surfaces or materials which are attracted to and wettable with oil, as distinguished from "oleophobic" wherein the surfaces are not so attracted or wetted with oil. Similarly, "hydrophilic" refers to those surfaces or materials which are attracted to and wettable with water as distinguished from "hydrophobic" wherein the surfaces are not so attracted or wetted with water. Generally, hydrophobic surfaces are also oleophilic.

Also, as used herein, "apertured" refers to any wall, barrier or sieve that has passages from its front surface to its rear surface. The sieve may be of sheet material that has been punched or drilled to make it apertured or the sieve may be fabricated in the form of a mesh that has strands running laterally and strands running crosswise which intersect or are woven to form a strong sieve wherein the apertures are the voids between the strands. The cylindrical cage herein described may be fabricated as a drum from sheet steel or similar material that has a sidewall which has been punched or drilled, or, as one of several alternatives, the sidewall may be made from sheet steel and apertured and spacing means may be provided to keep the oleophilic sieve away from the solid portion of the apertured drum surface or the sidewall may be in the form of grizzly bars.

Also, as used herein, "viscous oil phase" is defined as any oil phase more viscous than 0.2 poise at the temperature of the separation zone.

The present invention is primarily drawn to the separation of bitumen from particulate oleophilic solids and/or water, but may also be used to separate light or heavy oil from water and/or oleophobic solids, to separate emulsions and to separate shale oil from mixtures with water. U.S. Pat. No. 4,511,461 issued Apr. 16, 1985 is entitled "Process for Recovering Minerals and Metals by Oleophilic Adhesion", and is drawn to the separation of minerals from gangue, using similar principles.

The present invention makes special use of an apertured oleophilic endless sieve to capture oil phase particles, droplets and streamers from a slurry, emulsion or mixture with water. The operation of an apertured oleophilic sieve belt are described in some detail in Canadian Patent Nos. 1,085,760 issued Sept. 18, 1980, 1,129,363 issued Aug. 10, 1982, 1,132,473 issued Sept. 28, 1982, 1,141,318 issued Feb. 15, 1982 and 1,141,319 issued Feb. 2, 1983; and U.S. Pat. Nos. 4,224,138 issued Sept. 23, 1980 and 4,236,995 issued Dec. 2, 1980 to the same inventor as the present invention and also in U.S. Pat. Nos. 4,392,949 issued July 12, 1983, 4,405,446 issued Sept. 20, 1983, 4,511,461 issued Apr. 16, 1985 and 4,635,860 issued Jan. 13, 1987 all of which issued from the inventor's copending U.S. patent applications.

The present invention teaches improvements to the methods and systems taught in the above patents and patent applications in particular with respect to distributing onto an apertured oleophilic sieve an oil phase-aqueous phase mixture for separation in the separation zone. The present invention also teaches improvements to the above patents and patent applications in particular with respect to removal of oil phase from the apertured oleophilic endless sieve in a recovery zone.

Each zone will be described separately.

The Separation Zone

The configurations and the methods used in the previous patents and patent applications for separating a mixture of oil phase and aqueous phase on an apertured oleophilic sieve did not address methods for distributing such a mixture onto the sieve in a uniform manner over the width of the sieve. This distribution becomes particularly important when commercial equipment is designed that may use apertured oleophilic sieves as wide as 15 meters or more. Pumping a mixture containing water, sand and oil directly onto the sieve from a pipe will not uniformly spread the mixture onto the sieve and makes inefficient use of the total sieve area available for separation. Pumping the mixture into a hopper that spreads the mixture over the full width of the sieve gives difficulty because of settling of sand in the hopper close to the hopper outlet. This in turn gives problems relating to uniform feeding from the hopper outlet and also results in nonhomogeneity of mixture flowing from the hopper outlet to the surface of the sieve. Only when severe stirring of the hopper contents is carried out continuously will a uniform mixture be deposited over the full sieve width from the mixture hopper. Such mixing is costly in energy input and in replacement of stirrer blades which quickly wear out by abrasion by the sand of the mixture and in most cases represents an inconvenient method of mixture distribution.

Thus, distributing of the mixture uniformly over most or all of the width of the moving sieve is difficult with a hopper or with a pipe outlet. Furthermore, spreading of mixture over an adequate distance along the sieve in the direction of sieve movement has also been found difficult with a hopper or a pipe. Proper and efficient separation of oil phase from aqueous phase on the apertured oleophilic endless sieve conveyor is directly related to the way in which the total area of sieve is used for the separation. The larger this area and the more uniform the distribution over the full sieve width, the more efficient the separation. Uniformity of mixture composition along the sieve in the direction of sieve movement is not as important as uniformity of mixture composition over the full width of the sieve. In some cases the present invention has the advantage that it may first deposit most of the water and sand on the sieve and then later deposits the oil phase which has the overall effect of increasing the sieve capacity. In any case, the total area used for the separation is a function of both the sieve width and the sieve length used for the separation in the separation zone. Optimizing most effective use of both the width and of the length of the oleophilic revolving sieve conveyor is important for efficient separation.

Even if uniform distribution of mixture on the sieve were achieved over the maximum possible width of the sieve, there still would be the requirement of distribution of mixture over a long enough section of the sieve to achieve an adequate area of oleophilic sieving. A purpose of the present invention is to achieve effective oleophilic sieving over most of the belt width and over an adequate length of belt to thereby make most efficient use of the available sieve area in the separation zone.

Figure 11:
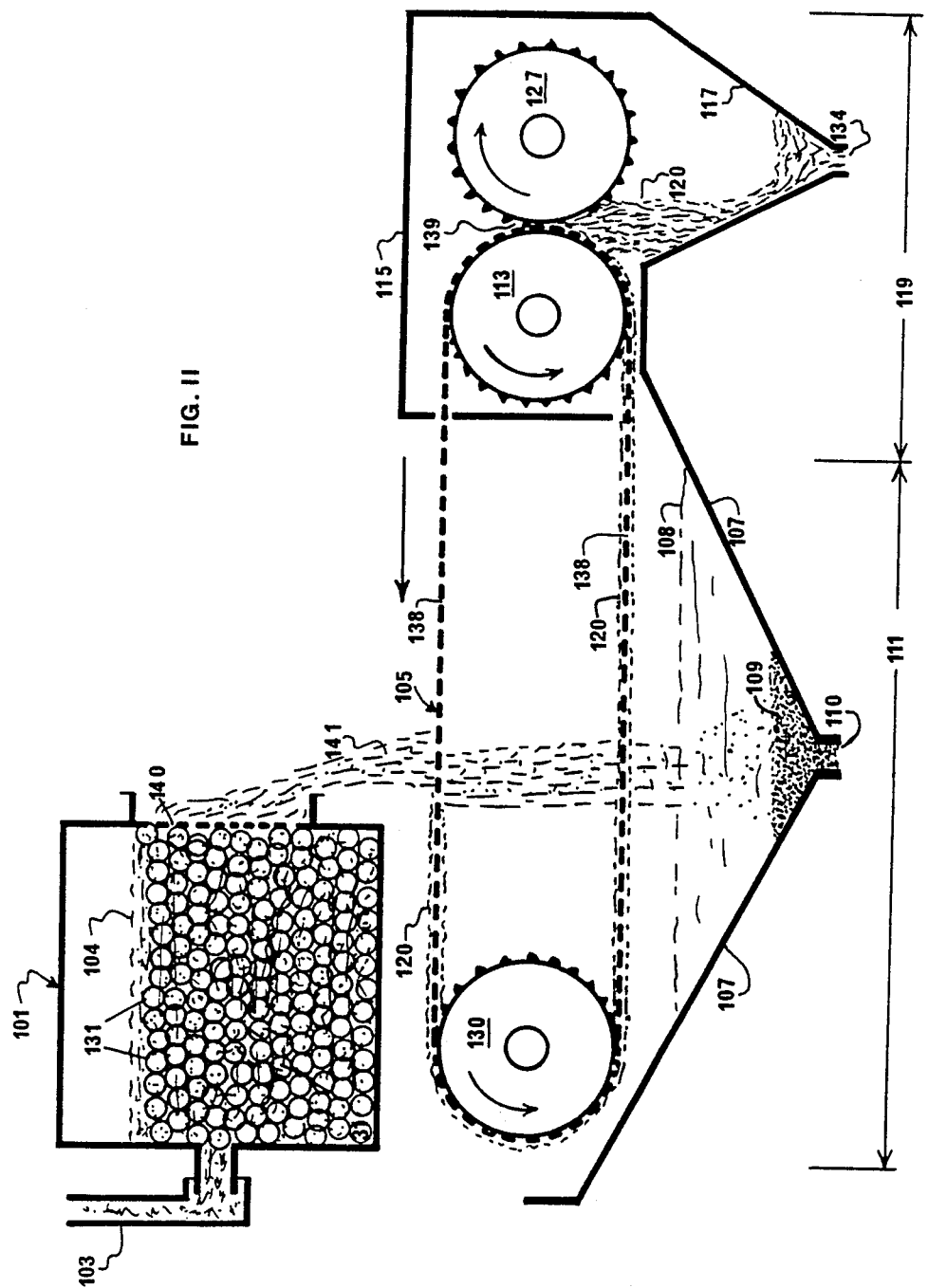
FIG. 11 is a cross sectional view of a separation zone combined with a recovery zone using squeeze rollers, but wherein a cage is not used in the separation zone to support the oleophilic sieve.

The problem of mixture distribution and effective use of the separation zone is further illustrated with FIG. 11. In this illustration, an agglomerator drum (generally corresponding to that disclosed in U.S. Pat. No. 4,244,138) is used to increase the oil phase particle size of the mixture before separation. As shown in the drawing, an oil phase-water phase mixture 104 enters a rotating agglomerator drum 101 through an inlet 103 and tumbles with oleophilic spheres 131 in the agglomerator drum for a time and then leaves the agglomerator drum through apertures 140 in the agglomerator end wall. The agglomerated mixture 141 consisting of agglomerated oil phase, water and particulate solids falls onto the top flight of an endless sieve conveyor 105 positioned between end rollers 130 and 113, in separation zone 111. Sieve 105 is located such that separation zone 111 is positioned in or above a water bath 107, having a liquid level 108 wherein particulate solids 109 may collect and be removed via outlet 110. Oil phase 120 adheres to the sieve surface and water, solids and some oil phase pass through the apertures 138 of the top flight of sieve 105 and then fall onto the bottom flight where water and solids pass through the apertures 138 and some additional oil phase 120 is captured by the oleophilic surface of the sieve 105. The top flight, coated with oil phase 120, revolves to the bottom flight, as indicated by the directional arrow, carrying oil phase with it and then enters the oil phase recovery zone 119 which recovery zone is illustrated in FIG. 11 as containing a housing 115, a product recovery hopper 117 and product outlet 134.

It may be seen from FIG. 11 that the mixture 141 falling from the agglomerator drum 101 onto the apertured oleophilic sieve 105, is in the form of a cascading stream. This stream is generally not wider than about half the width of the rotating agglomerator drum 101 and with a breadth that is less than the width of the stream. It is somewhat like a waterfall in shape that impacts the sieve at high velocity unless an elaborate set of baffles is used to spread the mixture over the sieve surface. Such baffles have not been found to be very effective for separating mixtures on apertured oleophilic sieves. Mixture falling onto the sieve from a height of 1.5 meters will have an impact velocity of about 3 meters per second when it contacts the belt. The result of this impact generally is abrasion of the oleophilic sieve surfaces by the particulate solids in the mixture and, as a result of this impact, considerable quantities of oil phase will break up and fall through the sieve apertures instead of adhering to and remaining on the sieve surfaces. Thus, there is an undesirable vertical impact velocity of mixture contacting the apertured oleophilic sieve under those conditions. In addition, for a sieve moving at, for example, two meters per second through the separation zone, to carry oil phase out of the separation zone into the recovery zone, there also is an impact velocity of two meters per second between the sieve and the mixture in the horizontal direction. This impact in the horizontal direction between the mixture and the sieve causes further abrasion of the sieve, and causes turbulence and breaking up of oil phase particles of the mixture into smaller oil phase particles. Those smaller oil phase particles more easily pass through the sieve apertures without contacting the sieve surfaces and are removed from the separation zone along with the aqueous phase. As a result, the separation efficiency is less than it could be.

It is a purpose of the present invention to minimize as much as possible the turbulence and impact velocity between the mixture and the apertured oleophilic sieve in the separation zone to minimize sieve abrasion and to improve separation efficiency. This is achieved, as explained in detail with reference to the drawings, by wrapping the apertured oleophilic endless sieve around an apertured cylindrical wall of a rotating cage in the separation zone. The oil phase-aqueous phase mixture enters the cage through that part of its upper circumterence not covered by the sieve or through a central inlet and is brought up to sieve speed by the tumbling action in the cage to eliminate impact velocity between the sieve and the mixture in the direction of sieve movement. With this configuration, the impact velocity between the mixture and the sieve in the direction perpendicular to the sieve surface is also reduced by the fact that the mixture is contained in the cage especially if the cage is immersed partly in a bath. While, in some cases, it is not necessary to suspend the cage in a bath, in many cases this is a preferred embodiment of the invention. When the mixture is tumbled in the cage immersed partly in a bath, the solids are more effectively kept in suspension in the mixture and the velocity of flow through the sieve (and hence the impact velocity in the direction perpendicular to the sieve) can be controlled by adjusting the difference between the level of the bath and the level of mixture in the cage.

The term "cage" is used to describe any structure having an apertured cylindrical sidewall enclosed by endwalls and rotatable about a generally horizontal axis. Any cage will be operable in the present invention if it meets the following requirements. The cage must be capable of tumbling an aqueous phase-oil phase-particulate solids mixture in preparation for distribution on the surface of an endless apertured oleophilic sieve. The cage must function as a conveyor roller to support the endless sieve in the manner of a conveyor belt in tracking alignment. The cage sidewall must be so constructed that oleophilic free bodies, if any, tumbling inside the cage, to assist in preparation of the mixture, cannot protrude through the sidewall apertures sufficiently to deform the surface of the sieve and adversely affect sieve operation. Finally, and perhaps most importantly, the apertures in the cage and in the sieve encircling the cage must cooperate in tandem as the sieve contacts and rotates with the cage such that mixture passing through the cage apertures will be deposited onto the sieve surface area for optimum separation by the sieve.

In previous patents and patent applications relating to the use of an apertured oleophilic belt sieve, reduction of impact velocity of mixture perpendicular to the sieve was taught and methods for achieving this were claimed. For example, Canadian Patent No. 1,141,319 issued Feb. 15, 1983, discloses the use of a floor under the non-immersed apertured oleophilic sieve to slow down the flow of mixture through the sieve. In some cases, this has proven to work effectively for that purpose, however, the methods of the present invention achieve this objective far more effectively for most mixtures. Especially when the separation equipment becomes large, as in a commercial plant, the methods of the present invention will be simpler and more effective for controlling the impact velocity between the mixture and the sieve and for controlling distribution of the mixture on the sieve.

Immersing an apertured oleophilic sieve completely or partly in a bath is taught in the prior patents and patent applications, but there are several unresolved practical problems that need to be solved to make the processes taught work mechanically most effectively in a large commercial operation. These problems relate to wear and abrasion of rotating shafts and bearings when these are immersed in the bath and also relating to the difficulty of containing oil phase so that it will pass through the sieve and not past the sieve or float away from the sieve. The present invention makes use of a large diameter cylindrical surface (the apertured cage wall) to support the apertured oleophilic revolving conveyor sieve in the separation zone. This cage can be partly immersed in a bath to immerse a large portion of the total sieve surface in the bath while still keeping all bearings and shafts out of the bath. Abrasion of rotating shafts and bearings, therefore, is not a problem in the process of the present invention and the cage serves to contain the mixture and oil phase of the mixture such that it must pass through the apertured oleophilic sieve and cannot float away from the process without first contacting the sieve surfaces.

Previous patents also claim the use of an apertured oleophilic drum to separate oil phase from aqueous phase (U.S. Pat. No. 4,236,995 issued Dec. 2, 1980, and Canadian Patent Nos. 1,085,760 issued Sept. 16, 1980 and No. 1,129,363 issued Aug. 10, 1982) and this works very effectively for small separators, but when separators become very large, the wall thickness of the cylindrical apertured drum wall starts to interfere with effective separation of oil phase from aqueous phase by the drum wall. In the process of the present invention, the cage or drum wall is not used for the separation and can become as thick as required to make a mechanically strong cage or drum. The apertured oleophilic conveyor sieve wrapped partially around the cage provides the means for the separation.

In contrast with the prior art, the present invention therefore makes use of an apertured cylindrical cage wall to support an apertured oleophilic endless conveyor sieve in a separation zone to separate viscous oil phase from aqueous phase. The sieve does the separation and the cage serves to bring the mixture of viscous oil phase and aqueous phase up to sieve speed prior to separation; to distribute the mixture onto the sieve surface for most effective separation and to assure that all oil phase of the mixture must pass to the sieve at least once for capture. If so required, the cage also serves to slow down the flow of aqueous phase through the sieve, to reduce mixture impact velocity perpendicular to the sieve thereby permitting more effective oil phase adhesion to the sieve surfaces, and to support the conveyor sieve in the separation zone without the need to immerse rotating shafts and bearings in a bath. The present invention also serves to conveniently convey captured oil phase out of the separation zone to a separate recovery zone for more effective oil phase removal from the apertured oleophilic sieve. The apertured oleophilic sieve is supported in the separation zone by the cage wall and in the recovery zone by at least a second cylindrical wall referred to as a conveyor roller.

The preferred embodiments of systems and methods to be used in practicing the invention are shown in the FIGS. 1, 2, 3, and 4.

The various embodiments of the invention will now be described in detail.

While the various figures illustrate different embodiments of the invention, there are obvious similarities shown in each figure. Thus, while certain elements may be depicted somewhat differently in each of the figures, they will bear the same numeral if they are used to perform the same function in the same manner. For example, the cage, whether it is a drum or a grizzly, will be referred to by the same numeral, as will the conveyor roller, whether it is heated or cold or has an oleophilic surface or not.

FIG. 1 is a perspective view of a typical separation and recovery apparatus. This figure shows a drum 1 with an apertured cylindrical wall 2 and solid endwalls 2a supported by shafts 3 in bearings 47 and driven with a belt 45 and sheave 46 by a motor (not shown) to cause the drum 1 to rotate and cause the endless sieve 5 to revolve and convey adhered oil phase out of a separation zone 11 into a recovery zone 19. Mixture flows into the drum through an inlet 3a in shaft 3 through a rotary seal 44 mounted to the hollow shaft 3 of the drum 1. A bath tank 7 with bottom outlet 10 is mounted around the lower portion of the drum to contain aqueous phase 1or removal. The level of aqueous phase (not shown) may be such as to partly immerse the drum 1 or may be maintained below the drum surface if so required. In this figure, motive drive is provided through the belt 45 and sheave 46 to the shaft 3 of the drum. Alternately, motive power can be provided to the other cylindrical surfaces in contact with the endless sieve 5, such as the conveyor roller 13 supported by shaft 14 and mounted in bearings 47 or deflection roller 18 supported by shaft 36 and mounted in bearings 47b, since the endless sieve 5 can transfer power between cylindrical surfaces in contact with the sieve. FIG. 1 shows that apertures 37 in the cylindrical drum wall 2 can be and usually are larger than the apertures 38 in the wall of the oleophilic endless sieve 5.

Separation using the apparatus ot FIG. 1 is achieved by introducing a slurry, emulsion or mixture of oil phase and water phase, with or without particulate solids in either or both phases, into the interior of the revolving drum 1 such that the mixture distributes evenly over the drum interior length and then passes through the apertures 37 in the drum wall 2 to the surface of the sieve 5 where the separation takes place in a separation zone 11 where the sieve is adjacent to the drum surface. In this separation zone, water phase and particulate solids in the water phase pass through the sieve apertures 38 and are discarded while oil phase attaches itself to the sieve upon contact because of adhesion to its oleophilic surfaces. The sieve revolves and adhering oil phase is continuously conveyed out of the separation zone 11 and into the recovery zone 19 where the oil phase is recovered from said sieve as a product. Removal of the oil phase from the sieve surface generally is enhanced by heat from the heated conveyor roller 13, followed by throwing oil phase off sieve 5 into hopper 17 by means of centrifugal force created by deflection roller 18; however, other methods of oil phase removal from the sieve are also suitable for the process of this invention. The lower portion of drum surface in the separation zone and the sieve surface in contact with this drum may be immersed in a bath, if so desired, to improve the eificiency of separation. The specifics of separation and recovery will be discussed in greater detail with reference to the remaining figures.

Figure 2:
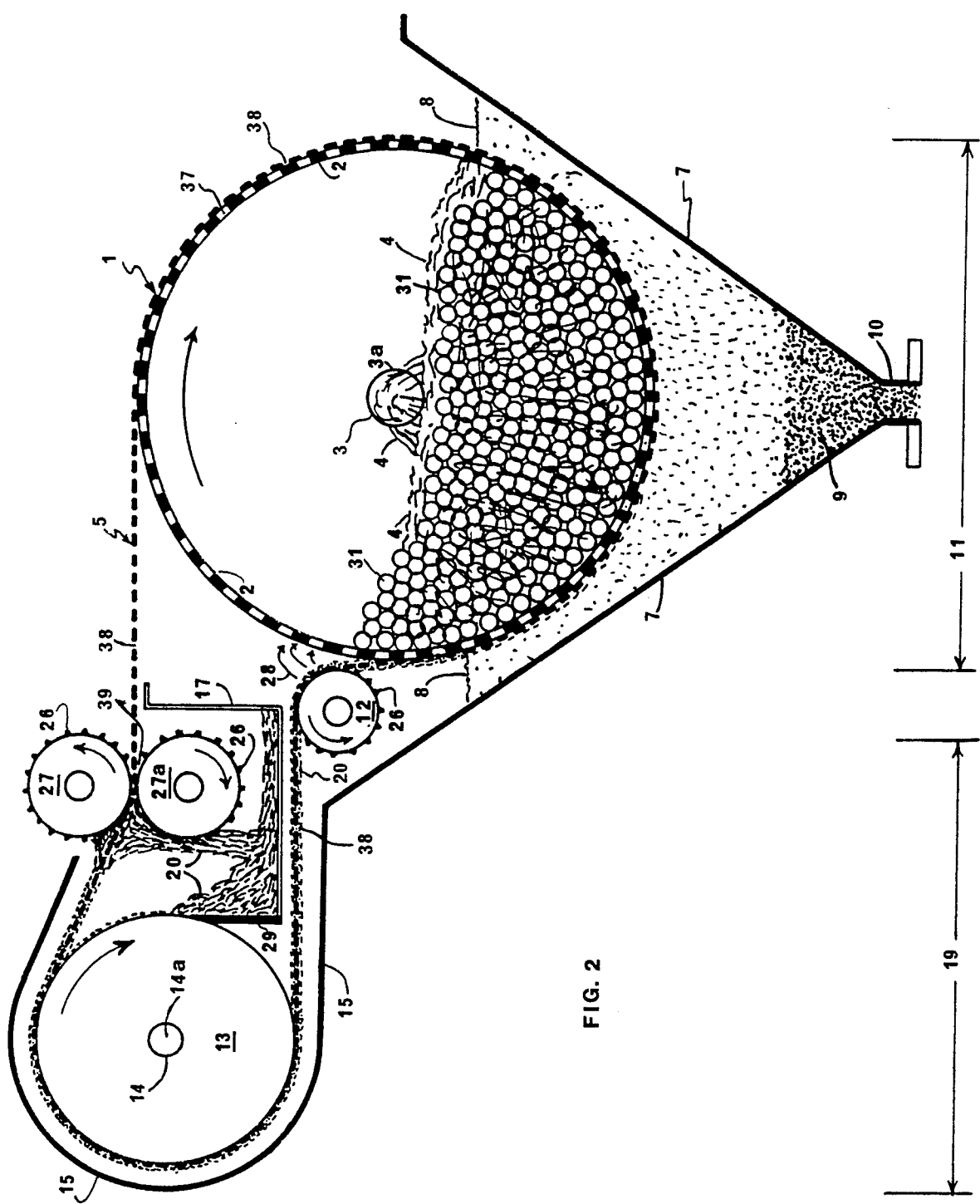
FIG. 2 is a cross sectional view of a second embodiment of a process and system for oil phase separation showing a separation zone utilizing a rotating apertured drum containing free bodies, a dewatering roller, and a recovery zone utilizing a heated conveyor roller and separate squeeze rollers.

With reference to FIG. 2, a mixture of oil phase and aqueous phase 4 enters through a central inlet 3a in shaft 3 of drum 1 that is provided with an apertured cylindrical wall 2 that supports an apertured oleophilic conveyor sieve 5. The direction of drum rotation and sieve movement is indicated by the arrows. Oleophilic free bodies 31 are shown to reside in drum 1 and tumble with the mixture 4 in the drum to slow down the flow of mixture 4 to the sieve 5 and also to agglomerate the oil phase before it reaches the surface of the sieve 5 in the separation zone 11. Examples of oleophilic free bodies that may be used are spheres, rods or pipes that are similar in length to the cage, or any other shapes that will remain in the cage and tumble in the cage to capture oil phase on their surfaces and shed the captured oil phase in the form of enlarged oil phase particles for capture by the oleophilic sieve. Mixture 4 with the oil phase particles agglomerated passes through the drum apertures 37 to the sieve surface where aqueous phase passes through the sieve apertures 38 and oil phase 20 adheres to the sieve surfaces upon contact. The rotation of the sieve 5 carries the oil phase coated sieve surfaces out of the separation zone 11 into the recovery zone 19. Aqueous phase that has passed through the sieve apertures 38 flows into the bath 7 which partly immerses the drum 1 as indicated by water level 8. Particulate solids 9 in the aqueous phase settle in the bottom of bath 7. Aqueous phase and associated solids 9 are removed from the bottom 10 of the bath 7.

An oleophilic surfaced deflection roller 12 is used to train the sieve and keep the sieve in contact with the drum wall 2 well above the bath water level 8 and to displace water from the sieve, as indicated by arrows 28. Mounds of oil phase 26 are continuously pulled out of the sieve apertures by the oleophilic surface of roller 12 and revolve with the roller surface back to the sieve 5 to displace aqueous phase, carried by the sieve 5 from the separation zone 11, out of the sieve apertures 38. Centrifugal force and gravitational force also assists in throwing aqueous phase, shown by arrows 28, back onto the drum wall 2 and back into the separation zone 11.

Operation of the recovery zone 19 portion of FIG. 2 is described later in this disclosure.

Figure 3:
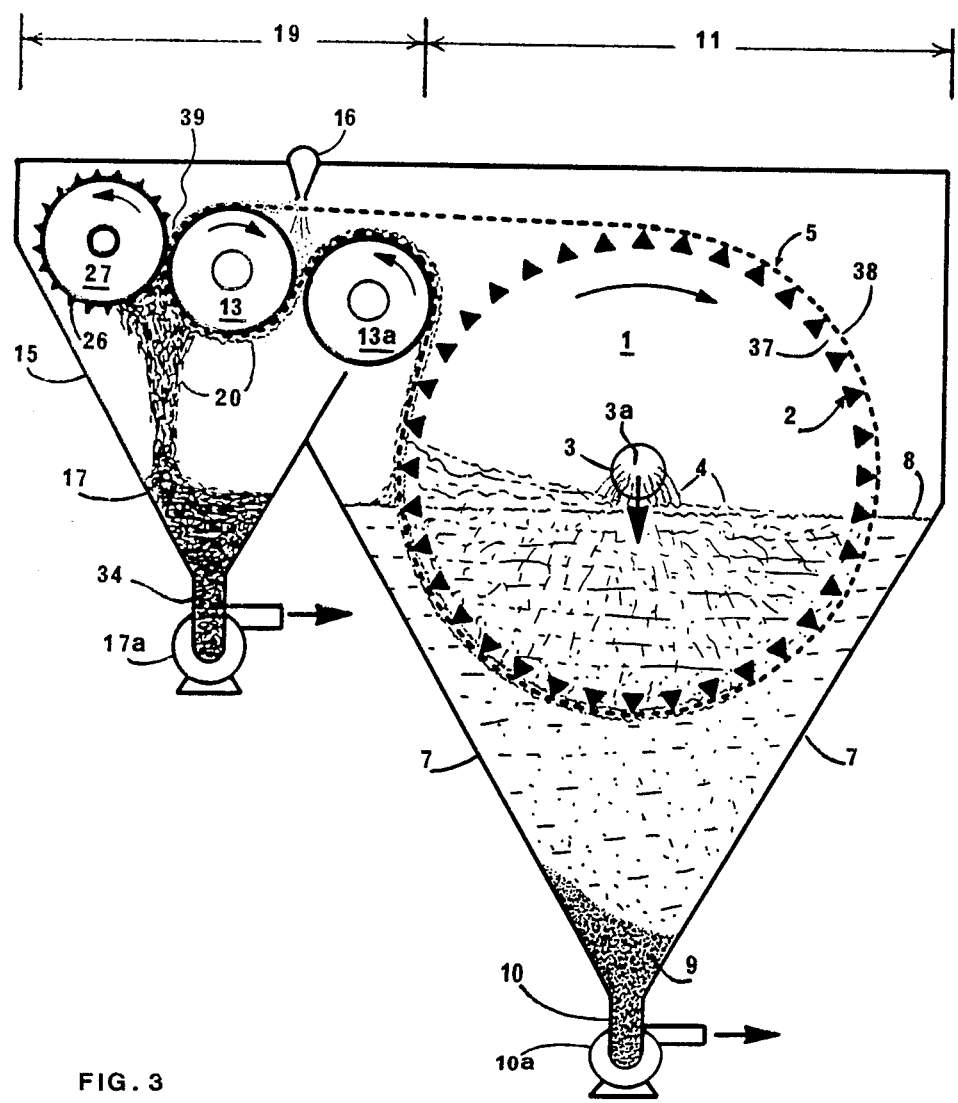
FIG. 3 is a cross sectional view of a third embodiment of a process and system for separation showing a separation zone utilizing a rotating grizzly and a recovery zone utilizing two heated rollers and a squeeze roller forming a nip with one of the heated rollers for oil phase removal.

FIG. 3 is a representation ol an embodiment utilizing a rotating grizzly instead of a drum. In this figure, grizzly 1 is provided with an apertured sidewall 2 formed by interconnecting grizzly bars with solid endwalls and internal braces or flanges and rotated about an axial shaft 3. A mixture of viscous oil phase and aqueous phase 4 enters the interior of grizzly 1 through an inlet 3a in shaft 3. The grizzly is partially immersed in a water bath 7 having a water level 8. The mixture is tumbled in grizzly 1 where oil phase particles may agglomerate or increase in particle size to thereby increase their chance of subsequent capture by sieve 5.

The oleophilic sieve 5 having apertures 38 is in the torm of an endless sieve conveyor supported by the cylindrical wall 2 of the grizzly in separation zone 11 and by two heated conveyor rollers 13 and 13a in recovery zone 19. Rollers 13 and 13a also provide sieve tension and tracking as will be subsequently explained.

The shape of the grizzly bars forming cylindrical wall 2 permits maximum use of the oleophilic sieve surface in the separation zone 11 while supporting the sieve. The grizzly 1, by its tumbling action, serves to deposit the slurry on the sieve uniformly across the full width thereof.

There is no minimal velocity difference between the mixture contacting the sieve through the apertures 37 in the grizzly wall 2 and the sieve 5 because the mixture is brought up to the surface speed of the sieve by the grizzly before it comes in contact with the sieve. Abrasion of the sieve 5 in separation zone 11 is, thereby, minimized even at high sieve surface speeds and oil phase can adhere to the sieve in an area where turbulence is minimized.

The aqueous phase of the mixture 4 passing through grizzly wall 2 onto sieve 5 falls through sieve apertures 38 and the oil phase of said mixture adheres to the sieve surface and is removed to a recovery zone for removal from the sieve, as will be explained in the following section.

As previously noted, the sieve and grizzly are partly immersed in a water bath 7 to slow down the flow of mixture 4 to the sieve 5 and to encourage adhesion of the oil phase to the sieve. Thus, no bearings or delicate mechanical parts come in contact with the mixture or water from the bath.

Particulate solids 9 passing through sieve apertures 38 fall to the bottom of bath 7 and are pumped through outlet 10 by pump 10a, along with excess water to a dewatering pit or to a settling pond. If desired, the water from the dewatering pit or from the tailings pond may be recycled to prepare additional aqueous phase-oil phase mixture for separation.

Figure 4:
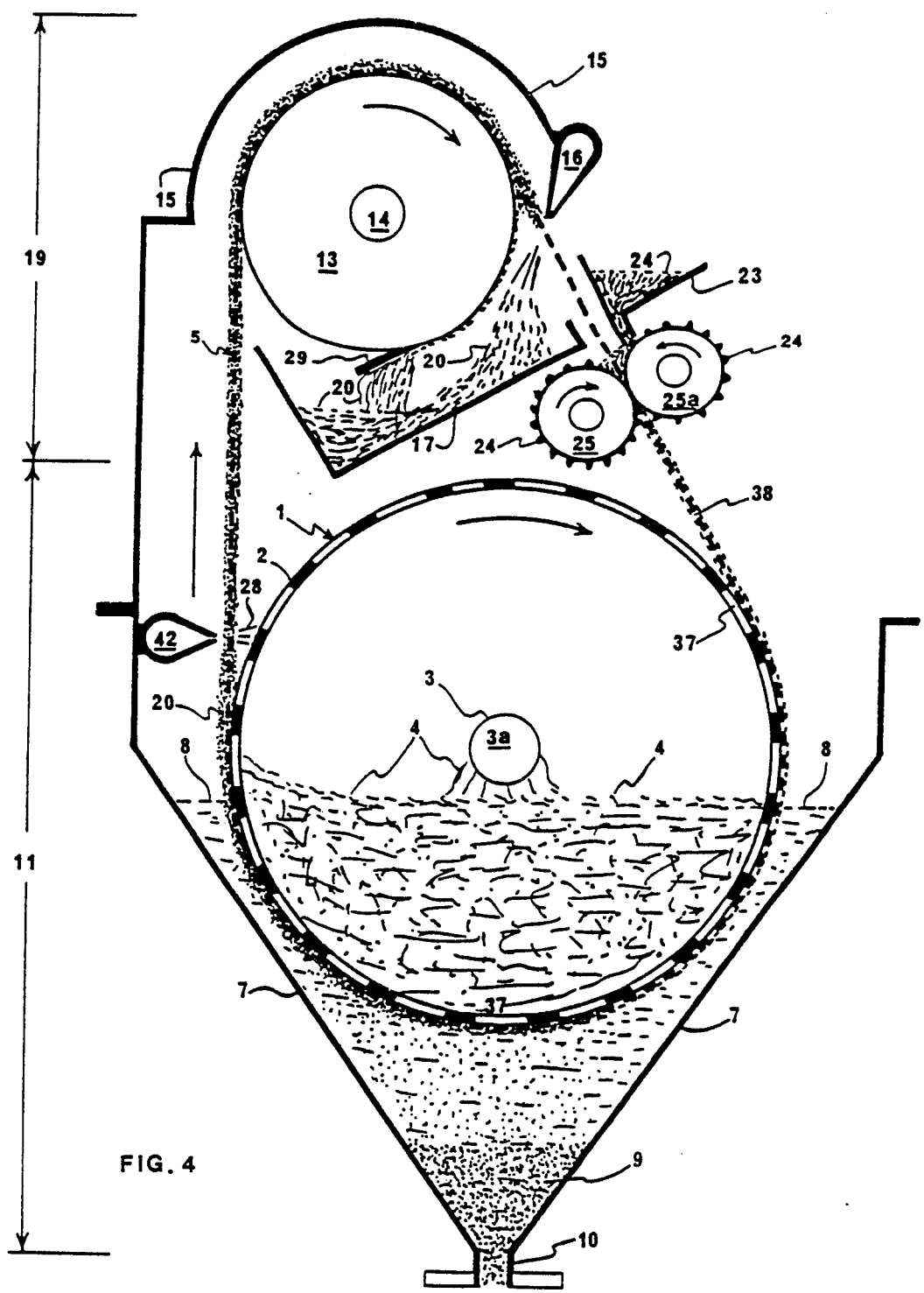
FIG. 4 is a cross sectional view of a still different embodiment of a system and process for separation showing a separation zone utilizing a rotating drum and a recovery zone wherein jetted air and a large heated roller and a scraper on the roller surface are used to remove oil phase from the sieve.

A still different separation embodiment is illustrated in FIG. 4. In this embodiment, a mixture 4 of aqueous phase and oil phase tumbling in a drum 1 without oleophilic free bodies is shown. For many mixtures separated by the process of the present invention, free bodies for agglomeration are not required in the drum. In this embodiment, mixture is introduced into the drum 1, through central inlet 3a in shaft 3, or through inlet means in the drum cylindrical wall section not covered by the sieve, and mixture 4 tumbles in the drum and is brought up to sieve movement speed. It then passes through the drum apertures 37 in the cylindrical wall 2 of the drum to the oleophilic endless sieve 5 in the separation zone 11. Aqueous phase passes through the sieve apertures 38 and oil phase 20 adheres to the sieve surfaces upon contact. It is then conveyed out ot the separation zone 11 in the direction of sieve movement, as indicated by the directional arrows, into an oil phase recovery zone 19 where the oil phase 20 is removed from the sieve 5. Before the oil phase covered sieve enters the recovery zone, an air knife 42 is used to direct a jet of air against the surface ot sieve 5 to remove aqueous phase droplets 28 out of the sieve apertures 38. Particulate solids 9 of the aqueous phase, when large and heavy, settle to the bottom of the bath 7 to be removed through an opening 10 in the bath along with other aqueous phase to maintain a liquid level 8 in the bath.

Figure 5:
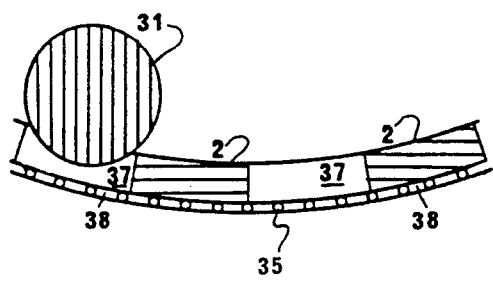
FIG. 5 is a detailed drawing of a drum wall, a free body inside the drum and a section of an endless sieve in contact with the outside surface of the drum wall.

FIG. 5 is an enlarged view of a section of the drum wall 2 in contact with the oleophilic sieve 5. In this view, it is again shown that the drum apertures 37 generally are much larger than the sieve apertures 38 and larger than the strands 35 which make up the sieve surfaces. The size of the drum apertures 37 is largely governed by the desired strength of the drum wall which may be weakened when too much structural wall material is removed by cutting away an inordinate large portion of the wall with large apertures. Also, the surface of the drum wall 2 has to be adequate to properly track the endless sieve surface and support it. When oleophilic spheres 31 (or other oleophilic free bodies) are contained in the drum, it is good practice, but not necessary, to keep the drum wall apertures 37 at least smaller than the diameter of the free bodies such that there is minimal or no deformation of the sieve due to oleophilic spheres or free bodies 31 pushing against the sieve 5 through the drum apertures 37. Instead of keeping the oleophilic sieve in direct contact with the apertured drum wall, it would, in many cases, be preferable to attach spacers or ribs to the outside of the drum wall in order to keep the oleophilic sieve trom contacting the total cylindrical drum wall surface. This increases the effective oleophilic sieve area used for the separation in the separation zone.

Figure 6:
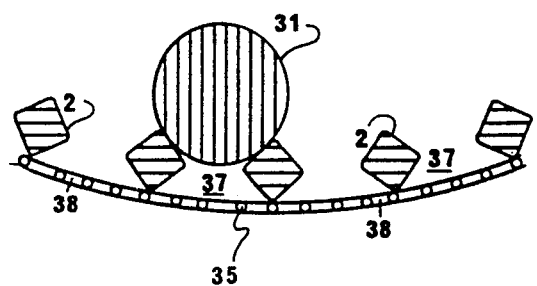
FIG. 6 is a detailed drawing of a grizzly wall a free body inside the grizzly and with an endless oleophilic sieve in contact with the outside surface of the grizzly.

FIG. 6 is an enlarged view of a section of an apertured cage wall 2 in the form of a grizzly in contact with the oleophilic sieve 5. The grizzly bars are shown to make up the wall 2 and the spaces 37 between the grizzly bars are apertures. An oleophilic sphere 31 is shown inside the grizzly. When spacers or ribs are not used, a grizzly has the advantage that the total cylindrical wall area in contact with the oleophilic sieve is less, when compared with a drum wall that has round holes as apertures, and, as a result, permits more open area on the sieve for passage of aqueous phase and attachment of oil phase.

Thus, in summary and in reference to all figures described in this section, in the separation zone 11, mixture 4 is uniformly distributed by tumbling in a rotating cage 1 that has an apertured cylindrical surface 2 partly covered with an oleophilic conveyor sieve 5, and the mixture 4 is brought up to sieve speed and then flows to the sieve 5 through the cage openings 37. Aqueous phase of the mixture then passes through the apertures 38 of the oleophilic sieve 5 for removal while oil phase 20 is captured by the sieve surfaces and is conveyed out of the separation zone 11. Residual aqueous phase carried out of the separation zone by the sieve 5 along with the oil phase 20 is removed from the sieve as is convenient (roller 12 of FIG. 2, air knife 42 of FIG. 4), and then the oil phase on the sieve is conveyed into a recovery zone 19 where the oil phase 20 is removed from the sieve 5 to become the oil phase product of the process. The process is continuous in that the mixture 4 continuously enters the cage 1 for separation and the conveyor sieve 5 revolves continuously and sequentially through the separation and recovery zones.

Recovery Zone

After the oil phase 20 coated on sieve 5 surfaces enters the recovery zone 19, oil phase 20 is removed from the sieve 5 to become the oil phase product of the process of the invention. Improved methods used for such oil phase removal are illustrated in FIGS. 1, 2, 3 and 7. These methods are disclosed in the following description, but not necessarily in numerical order.

In FIG. 2, the oil phase 20 contained on the apertured oleophilic sieve 5, after removal of residual aqueous phase, by means of deflection roller 12, comes in contact with steam heated conveyor roller 13 in insulated housing 15. Steam enters the roller 13 interior via inlet 14a through a rotary seal mounted in the hollow shaft 14 of the roller and condensate leaves the roller through another seal in the hollow roller shaft at the other end of the roller. The roller surface is at a high temperature because of the steam pressure inside the roller and this results in rapid heating of the sieve 5 and its oil phase contents 20. Some of the oil phase 20 remains on the surface, which may or may not be oleophilic, of the heated roller 13 and is scraped off with a doctor blade 29, while the remaining oil phase on the sieve 5 is passed between two resilient oleophilic rollers 27 and 27a that squeeze the oil phase 20 from the sieve 5. As the sieve apertures 38 pass beyond the nip 39 of the resilient rollers 27 and 27a, oil phase 20 is pulled out of the apertures and forms mounds 26 on the roller surfaces, and these mounds revolve with the roller surfaces back to the front of the rollers where the oil phase 20 is squeezed off the sieve 5. These mounds add to the oil phase 20 squeezed from the sieve. The oil phase removed from the sieve in this manner falls into a hopper 17 from where it is removed to become the oil phase product of the process of the invention. The apertures 38 in the sieve surface returning to the recovery zone 11 are open because the oil phase 20 has been pulled out of them by the oleophilic surfaced rollers 27 and 27a, and the separation process continues as the sieve surfaces sequentially and continuously pass through the separation zone 11, the recovery zone 19 and back to the separation zone, etc.

An alternate recovery zone is illustrated in FIG. 3. In this case, the conveyor roller 13 is heated and used directly to squeeze heated oil phase 20 from the sieve 5 with the assistance of a second squeeze roller 27 that presses the sieve surfaces tightly against the heated conveyor roller 13 to form a nip 39. Rollers 13 and 27 are contained in insulated housing 15. Recovery efficiency is improved by adding a second heated roller 13a, which is placed so as to increase the amount of wrap of sieve surface on the heated roller 13 for more effective heating of the oil phase on the sieve. A jet of air from air knife 16 may be used if it is necessary for some types of oil phase or for some recovery zone temperatures to blow residual oil phase out of the sieve apertures 38 before these return to the separation zone 11. This blown off oil phase returns to the sieve or hot rollers for subsequent recovery as it reenters the nip between the rollers 13 and 13a. The second roller 27, which forms the nip 39 with the heated roller 13, may have an oleophilic surface, and when it does, it will pull oil phase out of the sieve apertures after these pass the roller nip 39. This also serves to reopen the sieve apertures 38 for return to the separation zone, and the oil phase mounds 26 thus pulled out of the apertures 38 return back to the roller nip 39 for eventual removal as the oil phase is squeezed off the sieve surfaces and off the roller surfaces. The squeezed off oil phase 20 falls into a hopper 17 for removal from the bottom of the hopper by pump means 17a as the oil phase product of the process.

Figure 7:
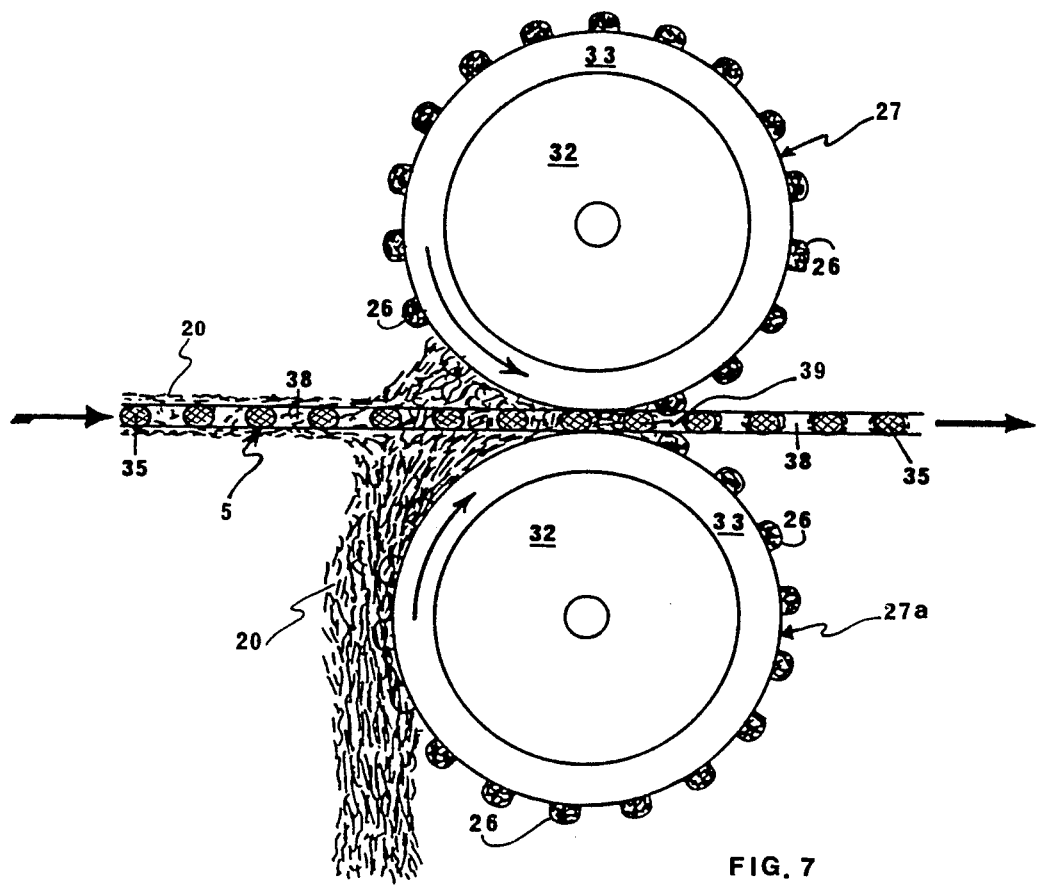
FIG. 7 is a detailed drawing of two squeeze rollers that are used to remove oil from an apertured oleophilic sieve.

The concept of using the nip between two rollers as discussed in the description of the recovery zone of FIG. 2 (and also applicable to FIG. 3) is illustrated in more detail in FIG. 7. The apertured oleophilic sieve 5, consisting of strands 35 with apertures 38 between the strands, moves through the nip 39 between two squeeze rollers 27 and 27a. In the drawing, both rollers 27 and 27a are oleophilic and are made from a solid core 32 and a resilient oleophilic coating 33. It is preferable, but not necessary, for both rollers to be oleophilic. For example, the hot roller 13 of FIG. 3 need not be oleophilic. The rollers of FIG. 7 are supported by shafts (not shown) that are held in bearings (not shown) that permit rotation, but 1 fix the position of each roller shaft. The shafts may be idler shafts or may be driven to provide movement to the sieve 5. Oil phase 20 coated on sieve surfaces enters in moving from left to right, as indicated by the directional arrows and moves through the nip 39 between the rollers. The distance between the roller surfaces at the nip 39 is such that sieve strands 35 can pass through the nip. Resiliency of the oleophilic roller coatings 33 permits variations between the thicknesses of the strands passing through the nip. In between the strands 35 the amount of oil phase 20 that can pass through the nip 39 is a direct function of the distance between the roller surfaces in the nip and the size of the sieve apertures 38. Any excess oil phase 20 that can not pass through the nip 39 is squeezed off the sieve 5 and accumulates in front of the rollers 27 and 27a. Since the sieve 5 is apertured, there is flow of oil phase possible through the sieve apertures in front of the rollers and, when the oil phase 20 in front of the rollers has accumulated in amounts that cannot be sustained there, the oil phase above the sieve passes through the sieve apertures 38, combines with the oil phase below the sieve and falls off the bottom roller 27a, as is illustrated in FIG. 7 into collection means.

After the sieve apertures pass the nip 39 of FIG. 7, the oleophilic surfaces of the rollers, which adhere to the oil phase in the apertures, pull oil phase 26 out of these apertures 38. The oil phase 20 contained in each aperture 38 at this point becomes distributed between the surfaces of the sieve strands, the surface of the top roller and the surface of the bottom roller. The amount of oil phase retained by each is influenced to a degree by the oleophilic attraction of oil phase 20 for each of these three surfaces. The net effect is that oil phase is removed out of the apertures 38 to provide open sieve apertures before that sieve portion returns back to the separation zone 11. Open sieve apertures 38 are required to permit aqueous phase to pass through the sieve 5 in the separation zone. Oil phase pulled out of the apertures 38 by the roller surfaces in this manner remains on the roller surfaces in the form of mounds 27, which revolve with the roller surfaces back to the roller nip 39, and add to the oil accumulating in front of the rollers 27 and 27a for removal. The mounds 26 of oil phase on the roller surfaces pulled out of the sieve apertures are very distinct when the oil phase is cold and/or has a high viscosity, but tend to spread out on the roller surfaces and are not as distinctly visible when the oil phase is hot and/or has a low viscosity. When one of the rollers is less oleophilic than the other roller, the amount of oil phase carried back to the nip by that less oleophilic roller will generally be less than the amount of oil phase carried back by the more oleophilic roller. Similarly, when the roller surfaces are less oleophilic than the sieve strands, the amount of oil removed out of the apertures will be less than when the roller surfaces are more oleophilic.

Oil phase of relatively high viscosity may be removed from the apertured oleophilic sieve in the manner just described without heating. Preheating the oil phase on the sieve, as shown in FIGS. 2 and 3, serves to increase the fluidity of the oil phase and causes it to fall more readily through the sieve apertures and/or off the rollers in the recovery zone to become the oil phase product. Heating of the oil phase before it reaches the nip between the rollers also reduces wear on the sieve and roller surface and reduces the mechanical energy required in the recovery zone for squeezing the oil and pulling oil out of the apertures. Since the oil phase in many cases will be further processed by processes which require oil phase at an elevated temperature, preheating of the oil phase on the sieve prior to recovery is a convenient approach to efficiently producing oil phase product for subsequent processing and/or for upgrading.

The recovery zone shown in FIG. 11 encompassed by insulated cover 115 illustrates the removal of oil phase 120 from the sieve 105 with or without the use of heat. Although the separation zone illustrated by FIG. 11 is generally disclosed in U.S. Pat. Nos. 4,224,138 and 4,236,995, the oil phase recovery technique is new and represents one embodiment that may be utilized in the present invention. In the recovery zone 119, conveyor roller 113 and squeeze roller 127, surrounded by insulated cover 115, are used to squeeze oil phase 120 from the sieve 105 at the nip 139 of the rollers. Either or both rollers may be heated or they may both be left unheated, and oil phase 120 is removed from the sieve 105 heated or unheated into hopper 117 for removal through outlet 134, as is suitable for the oil phase being recovered and as explained above.

Removal of oil phase in the recovery zone 19 by heating the oil phase on the sieve and forcing the oil off the sieve by various external forces is illustrated, in part, in FIGS. 1 and 4. The oil phase 20 on the sieve 5 is heated by a hot conveyor roller 13 and then oil phase 20 may be removed from a roller by gravity with the help of a doctor blade 29 on the surface of the heated roller 13 (FIG. 4), removed by shaking the reduced viscosity oil phase from the sieve (not shown), removed by centrifugal force around the hot roller throwing reduced viscosity oil phase from the sieve (not shown) or removed by centrifugal force around a deflecting roller that deflects the sieve after contacting by the hot roller and throws oil phase off the sieve due to the change of direction of movement of the sieve by the deflection roller (FIG. 1), or removed by blowing reduced viscosity oil phase from the sieve with a jet of air or steam (FIG. 4). When a jet of steam is used, preheating of the oil phase may also be done by containing exhaust steam from the steam jet for some distance close to the sieve, upstream (along the sieve) from the steam jet. In this manner, the oil phase on the sieve passes through a passage that contains the exhaust steam from the steam jet or steam knife before the thus preheated oil phase is blown off the sieve by the steam jet.

The recovery zone of FIG. 1 illustrates the use of a heated roller 13 to reduce the viscosity of the oil phase on the sieve 5 by heating it. An insulated cover (not shown) can be provided around this heated roller 13 to contain the heat. From the heated roller, conveyor sieve 5 is directed to the surface of a deflection roller 18, supported by shafts 36 mounted in bearings 47b. Roller 18 is of smaller diameter than the heated roller to impose a sharp deflection on the sieve surface after heating. The centrifugal forces at the area of deflection, which can be calculated from the sieve surface speed, the belt thickness and the diameter of the deflection roller, serve to throw reduced viscosity oil phase from the sieve surface into a chute or hopper 17 for removal as the oil phase product of the process. An additional cover (not shown) can be provided on the back side of the roller opposite the deflection point to catch oil phase that is pulled out of the apertures of the sieve by the deflection roller surface and sprays off the roller under the influence of centrifugal force around the deflection roller. Steam enters the hot roller 13 through an inlet 14a in hollow shaft 14 through a double rotary seal held by bearings 47a. Removal of condensate out of the roller is accomplished through the same hollow shaft 14 through a condensate tube (not shown). The use of double rotary seals is common in conjunction with rotary dryers.

The amount of centrifugal force available for forcing heated oil phase to leave the sieve may be calculated directly from:

$$F = \frac{W V^2}{g r}$$

where F is the centrifugal force in grams, W is the mass of the oil phase in grams, V is the oleophilic sieve conveyor speed in centimeters per second, g is the acceleration of gravity, usually taken as 981 centimeters per second per second, and r is the radius of curvature of the sieve at the sieve inflection point in centimeters.

The recovery zone illustrated in FIG. 4 makes use of a relatively large heated roller 13 to heat the oil phase 20 on the sieve 5. An air knife 16 then blows heated oil phase from the sieve 5 with a jet of air. Residual hot oil phase carried along by the surface ot the hot roller may fall off the roller or be removed by a doctor blade 29 scraping the roller surface or may be permitted to revolve back to the oil phase coated sieve for later removal from the sieve by air jetted from the air knife 16. Oil phase 20 leaving the sieve 5 is collected in a hopper 17 for removal from the separation zone as the oil phase product of the process. An insulated cover 15 encloses the heated roller to reduce heat loss from the process.

FIG. 4 also illustrates a means wherein the oleophilic surface of sieve 5 can be enhanced or restored as necessary. After oil phase 20 has been removed from the sieve in recovery zone 19 and before the sieve reengages drum sidewall 2 in separation zone 11, a coating of oleophilic material 24 or activator may be applied to improve subsequent adhesion of oil phase to the oleophilic sieve. As shown, the oleophilic material 24 is applied from a hopper 23 onto the surface of sieve 5 and passed between the nip of two squeeze rollers 25 and 25a to ensure a uniform application. Suitable coating materials may be a thin coating ot oil phase, rubber-based cement, or any other chemical or coating material which will enhance the oleophilic nature of the sieve surface.

Thus, in summary, oil phase conveyed by the sieve surfaces out of the separation zone 11 is removed from the sieve surfaces in the recovery zone. This may be done by squeezing the oil phase of the sieve with at least two rollers that form a nip to put pressure on the oil phase on the sieve and by removing oil phase out of the apertures after these have passed the nip between the rollers such that oil phase mounds form on the roller surfaces, which then revolve back to the nip to add to the excess oil phase squeezed off the sieve. Such oil phase removal may be done with oil phase as it arrives unheated on the sieve from the separation zone, or it may be preheated by one or more heated rollers to decrease the oil phase viscosity and make it flow otf the heated sieve more easily when squeezed. The heat flux from the rollers to the sieve and to the oil phase may be controlled to make the oil phase very fluid or just enough to soften the oil phase so that it will be squeezed off the sieve without difficulty. The preferred oil phase viscosity for removal of oil phase from the sieve in the recovery zone is a matter of optimization of the equipment and needs to be established for each oil phase recovered and each mixture being separated. Alternately, the oil phase on the sieve may be heated by a roller sufficiently hot enough to cause oil phase to flow off the sieve under the influence of an applied force. Centrifugal force may be used at the heated roller surface to remove oil phase lrom the sieve by running the sieve conveyor fast enough, by selecting a small enough diameter hot roller and by heating the roller hot enough to give enough centrifugal force and enough fluidity to the oil phase to be thrown clear from the sieve while the sieve is still in contact with the surface of the heated roller, and a doctor blade may be used, if desired, to remove hot oil phase from the surface of the hot roller not covered by the sieve. Heated, reduced viscosity, oil phase may also be removed by shaking the sieve or by training the sieve over a small diameter deflection roller. The smaller the diameter of this deflection roller, the sharper the sieve deflection and, for a given sieve surface speed, the greater the centrifugal force at the deflection point to throw reduced viscosity oil phase from the sieve. Finally, a jet of fluid, such as air or steam, may be used to blow oil phase from the sieve. Preheating of the oil phase and the sieve would normally be required when cold air is used to blow oil phase otf the sieve. Other sources of energy such as infrared rays, microwave rays, inductive energy or hot gasses may be used as well to heat the sieve in the recovery zone for affecting oil phase removal.

The overall concept of the present invention relates to operating the separation zone at a lower temperature than the recovery zone to make use of the differences in adhesion properties and viscosities of oil phase at different temperatures in conjunction with an endless oleophilic sieve to achieve most efficient mixture separation at an optimum separation temperature in a separation zone and to achieve most efficient oil phase removal from the sieve at an optimum recovery temperature in a recovery zone. In the separation zone, the apparatus configuration is controlled to optimize mixture distribution on the sieve at optimum separation temperature, optimum removal of aqueous phase and optimum transfer of oil phase to the sieve for capture. The best method for each type ot oil phase can be determined by a few simple performance tests in a prototype apparatus. In some cases, it is not necessary to operate the two zones at different temperatures. However, it is not anticipated that the recovery zone will operate efficiently at a lower temperature than the separation zone.

In general, the separation zone may operate at temperatures between about 1° and 99° C., and preferably between about 15° and 65° C. The recovery zone may operate at temperatures between ambient and 150° C., and preferably between about 25° and 105° C.

Belt Tension and Tracking Control

The oleophilic endless sieve of the present invention can be the most delicate part of the system utilized to carry out the process and it is normally exposed to a harsh environment that can do severe damage to the sieve if not properly protected. Any refinements that may be provided to minimize wear and tear on this sieve will serve to increase the effective operation period of the equipment before maintenance is required. FIGS. 8, 9 and 10 illustrate convenient methods for mounting rollers or recovery sections to minimize excess tension and stress variations on the sieve.

FIG. 8 illustrates the use of two air cylinders 48 to provide smooth and uniform tension shown by arrow 60 to a heated conveyor roller 13, such as used in FIGS. 1 or 4. Each air cylinder 48 attached to a solid base 62 supports one of the roller shalts 14 and bearing blocks 47a. An air valve 49 is used to control the relative amount of air and pressure in each cylinder via line 52. The air valve 49, supplied by instrument air 50 and provided with an air bleed 51, can preferably be controlled by signal means which monitor the position of the endless sieve (not shown) just after it leaves the roller 13 surface in order to provide accurate control of sieve tracking on the cylindrical surfaces of the cage and conveyor roller, or, in the alternative, it can be controlled by the position of the sieve anywhere along its length. Any of various devices may be used as the signal means, such as limit switches, photoelectric beams, electrical sensing devices, levers that control air valves, and the like. The pressure of the instrument air in the cylinders controls the tension on the sieve and accommodates a change in the sieve position due to sieve stretch or shrinkage without adding to the stresses. When the sieve stretches, the cylinders 48 adjust the position of their piston shafts 53 to accommodate the added sieve length and to keep the desired tension 60 When the sieve shrinks, the cylinders adjust the position of their piston shafts 53 to accommodate the reduction in sieve length without adding to the tension. This is of particular advantage when a hot recovery zone and a cold separation zone along the same sieve cause variations in sieve position due to sieve stretch or shrinkage during operation and during start up. The controlled air valve in conjunction with the support cylinders provide very effective control of sieve tension and tracking, as monitored by the signal means.

FIG. 8 shows springs 63 mounted between the piston shafts 53 and the bearings 47a. This may be done to smooth out small variations in sieve tension caused by slight eccentricities of the rollers as they roll or by lumps of solids that inadvertently may be carried along the cylindrical revolving surfaces under the sieve.

FIG. 8 also serves to further illustrate use of a rotary joint 43 for supply of steam through the inlet 14a of the hollow shaft 14 of a hot conveyor roller 13 in a recovery zone that uses steam condensing on its inside wall to heat the roller. Condensate leaves through the hollow shaft 14 through a rotary seal 57 housing a stationary standpipe as shown, or by a rotating shoe mounted on the inside cylinder wall which scoops up the condensate and permits it to flow through the outlet in rotary seal 57. In FIG. 8, steam enters through a hollow shaft at one end of the roller and condensate leaves through the other end of the roller. Another approach is to introduce steam into the roller at one end and to remove condensate from the same end by the use of a double rotary seal which permits steam to enter through an annulus and condensate to leave through a central tube in this annulus. Rotary seals and their use are well known to those skilled in the art.

A method for providing sieve tension and tracking to a recovery zone, such as the recovery zone of FIGS. 2 or 3, is illustrated in FIG. 9. The oil phase loaded oleophilic sieve 5 is wrapped around the heated conveyor roller 13 with a deflection roller 12. The sieve 5, atter oil phase removal, returns back to a separation zone (not shown). A squeeze roller 27 is mounted in bearing blocks 47c to press against the heated roller 13 and to squeeze heated oil phase off the sieve 5. As illustrated in FIG. 9, leat springs 65 are used to tighten the squeeze roller 27 against the heated roller 13, and leaf springs 66 may be used also to provide some flexibility to the deflection roller 12, as is illustrated. This flexibility in the position of the deflection roller will smooth out rapid cyclic variations in sieve tension which are caused by roller eccentricities or by irregularities of the cylinder wall of the separation zone drum. The recovery system of FIG. 9 is mounted on a frame or pillar 58 which can swivel slightly relative to the longitudinal axis of the pillar, with respect to a solid base 62a. The pillar can also revolve about the base of the pillar allowing lateral movement of the axis of roller 13 to permit the pillar to turn through a small angle of horizontal tilt and a small angle of vertical rotation by means of a pin 54 mounted in a bearing 47e that can rotate and swivel and that is mounted to a solid base 62. A piston shaft 53 of an air cylinder 48 is mounted on a swivel pin 67 at the side of the pillar 58 above its mid point, as illustrated, to provide the horizontal tilt. This air cylinder, mounted with a flexible mounting to base 62a, is supplied with compressed air so as to provide tension 60 to the sieve 5. Guides 61, in contact with cam followers mounted in a rigid frame supported by a solid base (not shown) prevent sideways movement of the pillar in a direction perpendicular to the axis of roller 13, but permit the air cylinder 48 to tilt the pillar laterally and move the position of rollers 12, 13 and 27, as required, to provide the necessary sieve tension. In addition, a second air cylinder 48a as supported by a solid base 62b and with its piston shatt 53a mounted flexibly with a crank 55, permits vertical rotation of the pillar 58 through a small angle around the pivot pin 54 to rotate the recovery system and make the sieve track on the rollers of the recovery system and on the drum of the separation zone.

Additional details are provided in FIG. 10, which is a cross sectional view of section A—A of FIG. 9. Operation of the air cylinder 48a to rotate the pillar 58 (and hence the recovery section rollers) through a small angle around pivot pin 54 is illustrated in FIG. 10. Instrument air 50 supplied to the control valve 49 maintains the desired position of the crank 55 by regulating the amount and pressure of control air 52 going to each side of the cylinder 48a. An air bleed 51 assists changes in the cylinder piston shaft 53a of the cylinder 48a. A flexible cylinder mounting to base 62b and non-rigid pin mounting of the crank 55 gives adequate flexing room for positive movement of the cylinder to rotate the pillar through a small angle of rotation required for proper tracking of the conveyor sieve on the rollers. Signal means in the form of a lever arm 64 in contact with the sieve 5 and connected to the air controller 49 is shown in FIG. 9 near the top of the drawing. The lever arm 64 is pushed against the edge of the sieve 5 and any change in the position of this lever arm causes a change in the relative pressure at the two outlets of controlled air 52 from the control valve 49 to the cylinder 48a and this, in turn, controls the position of the piston shaft 53a which, in turn, transmits to the crank 55 and adjusts the angle of vertical rotation of the pillar 58 to keep the sieve 5 tracking on the rollers. Very precise tracking can be achieved by this method. The cam followers in contact with the guides 61 to prevent sideways movement of the pillar 58 are mounted such as to leave enough room for the required pillar rotation, but prevent excess rotation of the pillar beyond what is required for proper tracking control. Other controlled means for vertically rotating the pillar may also be used such as a gear driven electric motor. When an electric motor is used for that purpose, electric contact switches are used as signal means to detect the sieve position and to control the electric motor to rotate the pillar to maintain proper tracking of the sieve on the rollers.

While the terms "horizontal" and "vertical" have been used to indicate positioning, these terms are relative. The actual position of the rollers, frames, pillars, and the like, will be dictated by optimal location in an operating plant and, therefore, the terminology is used functionally and not literally.

Air cylinders, therefore, may be used to provide effective tension to the oleophilic conveyor sieve and to accommodate gradual changes in sieve length without putting stress on the sieve. Cyclic variations in tension may be smoothed out and corrected by this method without the use of elaborate air cylinders and without the use of elaborate air control equipment. Springs may be used to smooth out rapid changes in sieve position and tension due to irregularities in the cylindrical surfaces and eccentricity as they rotate. Air cylinders may further be used to control tracking of the sieve on the roller or rollers. Sieve tracking and tension may be provided simultaneously by the use of two cylinders, each supporting one point of the roller mounting or mounting frame and controlling the air pressure in each cylinder with signal means actuated by the position of the sieve. Alternately, one or more air cylinders may be used to only provide sieve tension. In that case, an additional air cylinder may then be used to rotate the roller mounting through a small angle to keep the sieve tracking on the rollers. Alternately, a gear driven electric motor may be used to rotate the roller mounting or, alternately, a hydraulic drive motor may be used for that purpose. An air controller tollowing the belt position will be required when the air cylinder is used for rotating the roller mounting, while an electronic or electric control will be required to control the electric motor for the same purpose, or a hydraulic control for controlling the hydraulic motor.

In the drawings, springs are shown to support the conveyor rollers to smooth out fluctuations in the position and tension of the sieve as it moves due to slight eccentricities in the rollers or drum surface or due to solids being caught between the sieve surface and the surface of one or more of the cylindrical surfaces that support the sieve. Alternately, the drum may be mounted in springs for the same purpose or a deflection roller, mounted in springs, may be used instead for the same purpose.

A distinct advantage of the process of the instant invention relates to its high capacity and ability to carry on the oil phase separation at a relatively high bitumen viscosity and at a relatively high bitumen specific gravity or low temperature that will be of considerable importance when floating dredges are used to mine the oil sands. Extremely heavy and cumbersome mining equipment and complex conveying equipment are presently used in Alberta, Canada to dig up the oil sands and to convey these to the Hot Water Extraction plant where the oil sand is blended with steam and water to produce a slurry suitable for separation by the current commercial Hot Water Process. Mining the oil sands by flooding a portion of the mine with water and then using a floating dredge to dig up the oil sands has the advantage that a slurry of water and oil sand can be produced directly at the cutting head of the dredge, which can then be pumped to the extraction plant. In addition to producing a pumpable slurry, a floating barge dredge has much greater mobility than land based mining equipment and has the added advantage that a floating dredge automatically follows the water level, which can be adjusted as mining of oil sand proceeds into progressively deeper levels without costly relocation of the mining equipment. However, heating such a produced slurry to the Hot Water Process operating temperature is costly and it would be far more effective for the dredging operation if a separation process were available that did not require appreciable heating of the produced slurry. The oleopilic sieve process, as herein disclosed, satisfies these requirements.

It has been found that when heavy oleophilic spheres are used in the drum of FIG. 2 of the instant invention, that separation can be carried out with Alberta oil sand slurries at temperatures as low as 35° C. or lower. At these low temperatures, the bitumen is very viscous, but the heavy spheres serve to agglomerate the bitumen out of the slurry and actually transfer the bitumen in streamers through the drum apertures onto the oleophilic sieve, which then conveys this cold bitumen out of the separation zone into the recovery zone for removal of the bitumen from the sieve at an elevated temperature. Even at these low separation temperatures, the sand and the water of the slurry flow out of the drum and through the sieve apertures until these are plugged by the bitumen during separation and are conveyed out of the separation zone. The use of a hot recovery zone makes it possible to remove this viscous bitumen out of the apertures of the sieve and return open sieve apertures back to the separation zone on a continuous basis. Without the use of a hot recovery zone, the bitumen would be too viscous and sticky to be conveniently removed out of the sieve apertures.

More effective and more rapid separation of cool oil sand slurries may be achieved with the process as illustrated in FIG. 2 where the agglomerated mixture or slurry flows to the oleophilic sieve through the apertures of the cylindrical cage wall of the present invention as compared with the prior art process as illustrated in FIG. 11 where the agglomerated mixture flows through the apertures in the agglomerator drum end wall and falls onto the oleophilic sieve. This is so even when baffles or chutes are used in the process of FIG. 11 to minimize the difference between the velocity of the agglomerated slurry leaving the drum and the velocity of the belt.

This observation is also of importance for recovering oil phase (bitumen) out of Hot Water Process tailings pond sludge. This sludge resides at approximately 15° C. in these ponds and may contain up to 80% water, and typically contains 2.5% bitumen. Energy requirements to heat such a mixture several tens of degrees for a suitable separation process requires too much energy to make this an economic method for residual bitumen recovery. However, the process of the instant invention has made it possible to recover this bitumen from the sludge with minimal heat input or even without the need to heat this g sludge in the separation zone. Heating of the captured bitumen in the recovery zone after most of the water and solids have been removed at a cold temperature in the separation zone does not require a large amount of energy. It conveniently removes the bitumen out of the apertures of the sieve and prepares the bitumen for further clean up in a second oleophilic sieve separation, which would then be carried out at a somewhat higher temperature.

Recovery efficiency at these low temperatures may be further increased by adding a hydrocarbon diluent to the slurry or to the the sludge. Any hydrocarbon less viscous than the bitumen will work and, generally, a refinery cut similar to diesel fuel is preferred. The oleophilic spheres in the drum then serve to also mix the diluent with the mixture and to dilute the bitumen in the mixture to make it more fluid and permit separation at even lower temperatures.

To illustrate the process of the invention, the following examples are given. It should be understood, however, that they are given only in the way of illustration and in no way limit the scope of the invention. All weights are in terms of metric tons.

EXAMPLE 1

Mined oil sand from the Fort McMurray, Alberta, Canada area containing by weight 9.1% bitumen, 5.2% water and 85.7% particulate solids composed of 23.2% minus 45 micron and 76.8% plus 45 micron particles is mixed continuously with water and steam in a standard conditioning drum (mulling tumbler) to produce a slurry. Enough water is added to form a slurry in the drum to contain 27.9% water and enough steam is added to obtain a slurry temperature of 65° C. Residence time in the tumbler to digest the oil sand to slurry is 5 minutes. Slurry leaving the tumbler passes over a vibrating apertured screen, 3500 microns in size, which passes particles smaller than 3.5 millimeter as undersize, but which discards anything larger as oversize. Oversize is washed on the sieve with recycle water from the separator before being discarded. The undersize, combined with wash water, is pumped to the separator. Oil sand feed rate is 385.8 tons per hour and oversize reject amounts to 5.6 tons per hour, having a composition of 3.6% bitumen, 85.7% solids and 10.7% water.

The separator is similar to that illustrated in FIG. 3, Sieve tracking is controlled by the system disclosed in FIG. 9. The cage in the separation zone is 2 meters in diameter and 4 meters long and the cage cylindrical wall consists of triangular grizzly bars 5 centimeters wide and 5 centimeters high supported by circular steel end walls and by internal circular support hoops to maintain a cylindrical cross section. The grizzly bars are spaced 2 centimeters apart along the periphery of the cage. The oleophilic endless sieve is 4.1 meters wide and is supported by the cylindrical cage wall in the separation zone and by two rollers in the recovery zone, such as illustrated in FIG. 3. The sieve is woven from 2 millimeter diameter polyester monofilament strands and the apertures are square and 4 millimeters in size. Slurry is pumped from the vibrating screen to the cage interior through a rotary seal on its hollow shaft. The cage is partly immersed in a bath up to 20 centimeters below the centre line of the drum. The slurry tumbles in the cage at 20 revolutions per minute and thereby is brought up to the cage and sieve surface speed of 2.1 meters per second and then flows through the slits between the grizzly bars to the cage to the sieve surface. Aqueous phase of the slurry passes through the apertures of the oleophilic endless sieve and bitumen adheres to the sieve surfaces upon contact. The aqueous phase represents 1.4 tons of bitumen, 318.2 tons of solids and 117.6 tons of water per hour. The solids are permitted to settle in the bath and then the aqueous phase is removed from the bottom of the bath as tailings on a continuous basis. The tailings have a composition of 0.3% bitumen, 72.8% solids and 26.9% water. The composition of the liquid in the upper portion of the bath is approximately 0.5% bitumen, 25.0% solids and 74.5% water, and this mixture is recycled to the oversize screen of the conditioning zone to wash the oversize material before discarding it. The oleophilic endless sieve conveys 39.2 tons of bitumen, 11.3 tons of particulate solids and 37.6 tons of water per hour out of the separation zone. The first roller after the separation zone is a warm roller that serves to keep the sieve in contact with the cage above the bath level and also to increase the wrap of the sieve around a heated roller. It further serves to remove excess water from the sieve and, as a result, 10.4 tons of water, 2.2 tons of particulate solids and 0.4 tons oi bitumen per hour are thrown back onto the drum of the separation zone for reprocessing. After dewatering the bitumen loaded sieve comes in contact with a hot roller that has a surface temperature of 105° C. due to steam under pressure condensing on the inside wall of this roller. Steam flows into this roller through an annular duct in its hollow shaft and condensate and uncondensed steam flow out of the roller through a tube concentric with the hollow shaft and enter the first roller, also through a rotary seal. Condensate then leaves the first roller through another rotary seal in its hollow shaft. Rotary double seals in the roller shafts maintain the roller interior under steam pressure and permits flow of steam into the roller and flow of condensate and/or uncondensed steam out of the roller. Shoes, mounted at the interior roller walls and connected with the outlet tubes rotate with the roller surfaces and assure continuous flow of condensate and/or steam out of the roller. A neoprene coated roller presses against the surface of the sieve to form a nip with the hot roller and to squeeze heated bitumen from the sieve. All three rollers are 40 centimeters in diameter and 4.4 meters long. An air jet blows additional bitumen off the sieve after it has passed the hot roller for subsequent removal by the roller nip, as illustrated in FIG. 3. The bitumen product squeezed from the sieve in this manner consists of 33.4 tons of bitumen, 7.8 tons of particulate solids and 23.4 tons of water. This bitumen product is produced at 65° C. and readily flows into a hopper under the roller nip and is pumped from there to a dilution centrifuging process where 50 tons of naptha at 100° C. is added to this product and then the diluted bitumen is spun in a continuous centrifuge to remove the solids and water. Naptha is recovered by distillation and bitumen is upgraded to synthetic crude thereafter. The oleophilic sieve surfaces returning to the separation zone have a residual bitumen layer which is carried back to the separation zone. This layer assists in reducing abrasion of the sieve and represents 5.4 tons of bitumen, 1.3 tons of particulate solids and 3.8 tons of water per hour circulating with the sieve through the separation zone and through the recovery zone on a continuous basis. Bitumen is pulled out of the sieve apertures by the neoprene coated roller and blown off the sieve by the air jet to assure that the sieve apertures are open as these return to the separation zone.

EXAMPLE 2

The equipment of Example 1 is used for separating 521 tons per hour of tailings pond sludge pumped out of one of the Hot Water Process tailings ponds about 30 miles North of Fort McMurray, Alberta. The drum of the separation zone is charged with enough 25 millimeter (1.0 inch) diameter neoprene spheres to fill the cage to approximately 30% of its volume with spheres. The sludge pumped directly into this cage through its hollow shaft contains by weight 2.3% bitumen, 71.3% water and 26.4% solids and is obtained at a deposit temperature of 10° C. It is pumped directly into the cage of the separator without the addition of water or heat, but 2 tons of diesel fuel per hour are added to the cage. A cover is provided around the whole separator to enclose the separator moving parts and to discourage diesel fumes from escaping to the surrounding atmosphere. The neoprene spheres mix with the sludge in the cage and agglomerate bitumen out of the sludge onto their surfaces, blend it with diesel fuel, and shed this bitumen in the form of droplets and streamers many times longer than the bitumen particles of the original sludge for capture by the apertured oleophilic endless sieve which conveys the captured bitumen phase diluted with diesel fuel out of the separation zone at 10° C. Bitumen depleted sludge, containing 0.6% bitumen, 72.9% water and 26.5% solids (clay) passes through the sieve apertures as the aqueous phase into the bath and is removed from the bottom of the bath. Aqueous phase immerses the sieve to within 20 centimeters of the drum center line. The drum revolves at 4 revolutions per minute to give a sieve conveyor surface speed of approximately 0.4 meters per second. In the absence of a significant centrifugal force at the sieve deflection point of the dewatering roller at this low sieve speed, a jet of air is used to remove aqueous phase from the sieve before it enters the recovery zone. This air jet functions as illustrated in FIG. 4. Approximately 5 tons of aqueous phase this way is blown off the belt per hour and returns to the separation zone. A total of 20.9 tons per hour of diluted bitumen are squeezed off the belt by the nip of the rollers in the recovery zone at a temperature of 95° C. The bitumen product has a composition of 52.2% bitumen, 26.3% water and 21.5% solids. This bitumen product is sent to a second smaller oleophilic sieve separator of the same design and is blended with 20 tons per hour of water in the cage of this second separator to separate the oil phase from the aqueous phase for a second time to produce a bitumen product containing 65.1% bitumen, 29.0% water and 5.9% solids. This bitumen product is further processed by dilution centrifuging as was done with the bitumen product of Example 1. The aqueous phase from the second separator after passing through the sieve apertures is returned to the first separator where it is admixed with the mixture entering the cage of the first separator to recover bitumen that would be lost if the aqueous phase of the second separator were discarded immediately.

EXAMPLE 3

The equipment of Example 2 is used to separate the 521 tons of sludge per hour and the same procedure is followed as in Example 2, except that a second separator is not used, but a spray of clean cold water (15° C.) is used to wash the sieve surface and the bitumen on the sieve as these emerge out of the separation zone during the dewatering step of the process. This water removes some of the conveyed clay from the sieve and improves the quality of the bitumen product. The bitumen product squeezed off the sieve by the rollers in the recovery zone now has a composition of 61.2% bitumen, 26.4% water and 12.4% solids.

EXAMPLE 4

The first separator of Example 2 is used to separate 500 tons per hour of emulsion produced by a battery of heavy oil wells used in a steam drive pilot plant to recover bitumen from deep tar sand formations. The produced emulsion, which contains 12.2% bitumen, 0.2% clay and 87.6% water, is cooled by a heat exchanger to 70° C. and then flows directly through its hollow shaft into the cage of the separation zone which revolves at 22 revolutions per minute. Along with the emulsion, 0.8 tons of calcium sulfate per hour is added to the contents of the drum to chemically break the emulsion. The spheres agglomerate the oil phase of the emulsion as the chemical emulsion breaking process takes place in the revolving drum of the separator and permit capture of this oil phase as it flows to the sieve surface through the cage apertures. Aqueous phase composed of 0.1% clay, 0.1% bitumen and 99.8% water passes through the apertures of the sieve into the bath and is removed from an outlet at the bottom. The cage is partly immersed in the bath water up to a level 15 centimeters below the center line of the drum. The first roller of the recovery zone removes water from the sieve as in Example 1. The bitumen product squeezed from the second and third rollers in the recovery zone amounts to 75.5 tons per hour and has a composition of 80.0% bitumen, 19.6% water and 0.4% clay.

There are some refinements inherent in the art of the present invention which are considered to be part of this instant invention. One such refinement is that when the oil phase product of the process of the invention contains significant quantities of hydrophilic solids, this oil phase product may be admixed with water and possibly chemicaWl and/or a hydrocarbon diluent and directed to a second oleophilic sieve separation apparatus in series, similar to the first one, for once more separating the oil phase from the aqueous phase to obtain a cleaner oil phase product. The aqueous phase from the second separation may then be returned and admixed with the mixture being separated in the first separation step in order to minimize oil phase loss from the overall separation. Similarly, if the aqueous phase from a first separation contains an undesirable amount of uncaptured oil phase, it, in turn, may be directed to a third oleophilic sieve separator to recover additional oil phase before discarding the aqueous phase that has passed through the apertures of the oleophilic sieve. These refinements may be used as required to achieve maximum oil phase recovery and to produce an optimum oil phase product quality. However, economics will, in most cases, dictate the degree of such series operation practicable. As far as the art of the present invention is concerned, such series operation of oleophilic sieve separators would be considered as repeat performances of the practice of this invention of separating oil phase from a mixture containing oil phase and aqueous phase.

While the above specification describes the invention in terms of its best known embodiments, other undisclosed embodiments and applications will become obvious to one skilled in the art from this disclosure. Therefore, the invention is not to be limited solely to the disclosed embodiments, but is to be accorded the full scope of the appended claims.

What is claimed is:

1. A method for the continuous separation and removal of a viscous oil phase from a viscous oil phase-aqueous phase mixture which comprises:
   (a) providing a continuous separation and recovery system consisting of a rotating conveyor in the form of an apertured oleophilic endless sieve having upper and lower surfaces wherein the apertures extend from said upper to said lower surfaces and wherein said sieve is fabricated from a member selected from the group consisting of a sheet material through which said apertures have been created or a strong mesh material consisting of intersecting strands wherein said apertures are voids between said strands, said sieve being of uniform width supported in a separation zone by a cylindrical generally horizontal rotating cage having an apertured cylindrical sidewall, said cylindrical cage containing oleophilic surface free bodies having a diameter larger than the diameter of the apertures in said cylindrical sidewall, said cylindrical sidewall being partially enwraped about the circumference thereof by said sieve, said sieve being supported, in a recovery zone by a rotating conveyor roller, said cage, conveyor roller and seive being rotated at substantially the same surface speed such that the sieve rotates sequentially and continuusly from separation zone to recovery zone;

(b) continuously introducing a mixture including at least an aqueous phase and a viscous oil phase into said rotating cage and tumbling said mixture within said cage wherein free bodies in said cage come in contact with said viscous oil phase as said mixture and free bodies tumble in said cage causing particles of said viscous oil phase to temporarily adhere to the surface of said free bodies and unite to form enlarged viscous oil phase particles until such particles become sufficiently large that they are removed from the surface of said free bodies as enlarged viscous oil phase particles;

(c) continuously transferring said aqueous phase-viscous oil phase mixture containing said enlarged viscous oil phase particles through said apertures in said cylindrical sidewall onto said oleophilic sieve across the width thereof causing said enlarged viscous oil phase particles to contact and adhere to said sieve surfaces and the aqueous phase to pass through said sieve apertures for subsequent removal; and (d) rotating said sieve containing said adhered viscous oil phase away from contact with said rotating cage and out of said separation zone into said recovery zone where the adhered viscous oil phase is recovered from said oleophilic sieve which is then rotated back to said separation zone and into contact with said rotating cage for further viscous oil phase separation.

2. A method according to claim 1 wherein the oil in said viscous oil phase has a viscosity greater than 0.2 poise and less than 6,000 poises.

3. A method according to claim 1 wherein said rotating cage, in the area enwrapped by said sieve, is partly immersed in a water bath and wherein said aqueous phase, after passing through said sieve apertures, collects in said bath for removal.

4. A method according to claim 1 wherein said oleophilic surfaced free bodies are in the form of spheres, rods or pipes.

5. A method according to claim 1 wherein said size of the apertures in said cylindrical wall and the thickness of said cylindrical wall are such that said free bodies cannot deform the surface of said oleophilic sieve through the apertures in said cylindrical wall.

6. A method according to claim 1 wherein the apertures in said oleophilic sieve are between about 2 and 20 millimeters.

7. A method according to claim 6 wherein said viscous oil phase-aqueous phase mixture is a mixture selected from the group consisting of an oil sand slurry, oil sand middlings, oil sand tailings, oil sand tailings pond contents, in situ produced bitumen, in situ produced heavy oil, heavy oil emulsion, heavy oil sludge, emulsion sludge and shale oil emulsion.

8. A method according to claim 7 wherein a liquid hydrocarbon is added to said mixture in said rotating cage to reduce the viscosity of the oil in the viscous oil phase at the operating temperature in said separation zone.

9. A method according to claim 1 wherein the temperature of said mixture and said water bath is between about 1° and 99° C.

10. A method according to claim 1 wherein said rotating cage is a rotating drum.

11. A method according to claim 10 wherein spacing means prevent full contact between the sieve surface and the cylindrical drum wall in order to increase the effective area of the sieve used for separation in the separation zone.

12. A method according to claim 1 wherein said rotating cage is a rotating grizzly.

13. A method according to claim 1 wherein the oil phase adhering to the oleophilic sieve is partially dewatered as the oleophilic sieve rotates from said separation zone to said recovery zone.

14. A method according to claim 13 wherein dewatering is achieved by means of an oleophilic surfaced roller having oil phase adhering thereon, which roller comes into contact with and deflects said sieve, thereby forcing aqueous phase out of the apertures of said sieve.

15. A method according to claim 1 wherein the viscous oil phase adhering to said oleophilic sieve is continuously removed from said sieve in said recovery zone by passing said sieve between aligned rollers such that the sieve is squeezed through the nip between said rollers causing oil phase, which cannot pass the nip to flow off the sieve and rollers and be collected in collection means as a viscous oil phase product.

16. A method according to claim 15 wherein at least one of said rollers has an oleophilic surface which pulls adhered viscous oil phase out of the apertures of said sieve onto the oleophilic surface of said roller as said sieve passes out of said nip and returns the viscous oil phase thus removed back to the nip as said oleophilic surfaced roller revolves.

17. A method according to claim 15 wherein at least one of said rollers is a heated roller causing the viscous oil phase on said sieve to be reduced in viscosity and thereby flow more readily from the sieve due to the nip between said rollers into said collection means.

18. A method according to claim 17 wherein one of said rollers is the conveyor roller which is heated and wherein the other roller at least has an oleophilic surface.

19. A method according to claim 1 wherein the viscous oil phase adhering to said oleophilic sieve is continuously removed from said sieve in said recovery zone by passing said sieve over one or more heated rollers to reduce the viscosity of said viscous oil phase on said sieve as it passes over said rollers followed by removal of said reduced viscosity oil phase from said sieve into collection means by means of an applied force.

20. A method according to claim 19 wherein the applied force consists of passing said sieve bIetween aligned rollers such that the sieve is squeezed through the nip between said rollers causing reduced viscosity oil phase which cannot pass the nip to flow off the sieve and rollers into collection means as reduced viscosity oil phase product.

21. A method according to claim 20 wherein at least one of said aligned rollers has an oleophilic surface which pulls adhered reduced viscosity oil phase out of the apertures of said sieve on to the oleophilic surface of said roller as said sieve passes out of said nip and returns the reduced viscosity oil phase back to the nip as said oleophilic surfaced roller revolves.

22. A method according to claim 21 wherein reduced viscosity oil phase adhering to the surface of at least one of said heated rollers is scraped therefrom by a doctor blade mounted against the surface of said roller and into said collection means.

23. A method according to claim 19 wherein the applied force is a centrifugal force applied against the sieve surface causing reduced viscosity oil phase to be thrown from the sieve into said collection means.

24. A method according to claim 23 wherein the centrifugal force is applied by means of a deflection roller, which deflects the surface of the sieve after it leaves the heated roller.

25. A method as in claim 19 wherein one of said heated rollers is said conveyor roller.

26. A method according to claim 19 wherein the applied force is a reciprocating force, thereby shaking the sieve causing reduced viscosity oil phase to be thrown from the sieve into said collection means.

27. A method according to claim 19 wherein reduced viscosity oil phase adhering to the surface of at least one of said heated rollers is scraped therefrom by a doctor blade mounted against the surface of said heated roller and into said collection means.

28. A method according to claim 19 wherein the applied force is a jet of air which impacts upon the surface of said sieve and blows reduced viscosity oil phase from said sieve surface into collection means.

29. A method according to claim 28 wherein reduced viscosity oil phase adhering to the surface of at least one of said heated rollers is scraped therefrom by a doctor blade mounted against the surface of said heated roller and into said collection means.

30. A method according to claim 19 wherein said one or more rollers are heated by steam condensing inside each roller, said steam entering through a rotary seal mounted in the axis of each roller while condensate leaves each roller through another rotary seal mounted at the axis of each roller.

31. method according to claim 1 wherein the viscous oil phase adhering to said oleophilic sieve is continuously removed from said sieve into collection means by heat applied in the recovery zone to said sieve by means other than said heated rollers.

32. A method according to claim 31 wherein said heat is applied by means of live steam and the oil adhering to the sieve is stripped from said sieve into collection means by a jet of steam.

33. A method according to claim 31 wherein said heat is applied from a source selected from the group consisting of infrared heat, microwaves, induction heating and hot gas.

34. A system for the continuous separation and removal of a viscous oil from a mixture of viscous oil phase and aqueous phase which comprises:
(a) a cylindrical generally horizontal rotatable cage having an apertured continuous sidewall, said cage further containing oleophilic surface free bodies having diameters larger than the diameter of the apertures in the apertured continuous sidewall, said cage being mounted by axial shafts in bearings in a separation zone, said cage having inlet means for introducing a mixture of viscous oil phase and aqueous phase into the interior thereof and containing drive means to rotate said cage;

(b) a cylindrical rotatable conveyer roller mounted in axial shafts in bearing blocks in a recovery zone;
(c) a rotatable conveyor in the form of an apertured oleophilic endless sieve having upper and lower surfaces wherein the apertures extend from said upper to said lower surfaces and wherein said sieve is fabricated from a member selected from the group consisting of a sheet material through which said apertures have been created or a strong mesh material consisting of intersecting strands wherein said apertures are voids between said strands, said sieve being of generally uniform width supported by and partially encircling the apertured continuous sidewall of said cage and the surface of said conveyor roller;
(d) means in said separation zone around the lower portion of said cage to collect and remove aqueus phase passing through the apertures in said cage sidewall and in said oleophilic sieve; and
(e) means in said recovery zone to remove viscous oil phase adhering to said sieve and collection means to recover the oil phase thus removed as a final product.

35. A system according to claim 34 wherein the means in the separation zone around the lower portion of said cage is a bath.

36. A system according to claim 35 wherein the lower portion of the rotatable cage below the bearings and in the area where said sieve contacts said cylindrical cage sidewall is immersed in said bath.

37. A system according to claim 34 wherein the apertures in said olephilic sieve are between 2 and 20 millimeters in size.

38. A system according to claim 34 wherein said rotatable cage is a rotatable drum.

39. A system according to claim 38 wherein spacing means are provided between the outside of the cylindrical drum sidewall and the sieve surface to increase the effective area of the oleophilic sieve for sieving in the separation zone.

40. A system according to claim 34 wherein said rotatable cage is a rotatable grizzly.

41. A system according to claim 34 wherein the means in said recovery zone for removing viscous oil phase from said sieve consists of adjacent aligned rollers mounted on either side of the sieve, thereby squeezing the sieve at the nip thereof causing oil phase to fall from the sieve due to the nip between the rollers into collection means located below said rollers.

42. A system according to claim 41 wherein at least one of said rollers has an oleophilic surface.

43. A system according to claim 42 wherein one or more of said rollers is heated.

44. A system according to claim 43 wherein the heated roller is the conveyor roller and the other roller has an oleophilic surface.

45. A system according to claim 34 wherein the means in said recovery zone for removing viscous oil phase from said sieve consists of one or more heated rollers to reduce the viscosity of the oil phase on the sieve followed by a means of applied force to remove the reduced viscosity oil phase from said sieve into said collection means.

46. A system according to claim 45 wherein said means of applied force consists of adjacent aligned rollers at least one of which has an oleophilic surface mounted on either side of the sieve, thereby squeezing the sieve at the nip thereof causing oil phase of reduced viscosity to fall from the sieve due to the nip between the rollers into collection means located below said rollers and heated conveyor roller.

47. A system according to claim 46 wherein one or more of said alignment rollers is a heated roller.

48. A system according to claim 45 wherein said means of applied force is a deflection roller which deflects the surface of the sieve causing reduced viscosity oil phase to be thrown from the sieve into said collection means by centrifugal force.

49. A system according to claim 45 wherein said means of applied force is a gas knife which forces a jet of gas onto the surface of the sieve, thereby flowing reduced viscosity oil phase from the surface of said sieve into said collection means.

50. A system according to claim 34 wherein the sieve is tensioned and maintained in tracking alignment on the surface of said conveyor roller and of said apertured continuous sidewall of said cage by means of two air cylinders positioned in the recovery zone interconnecting said bearing blocks supporting said conveyor roller with a solid base, which air cylinders function to allow the axis of rotation of said conveyor roller to move laterally a limited distance to provide tension to the oleophilic sieve and to also rotate said axis through a small angle so as to not be parallel with the oleophilic sieve and thereby cause a shifting of the sieve along the face of the conveyor roller such that the sieve is maintained in tracking alignment on the surfaces of said conveyor roller and said apertured sidewall of said cage; and signal means positioned adjacent to said sieve, said air cylinders being operated by compressed air means which move compressed air into and out of said air cylinders in response to said signal means which monitors the position of the sieve.

51. A system according to claim 34 wherein said bearing blocks are mounted to a frame wherein:
   (a) said frame is supported at one end by pivot means allowing limited rotation about both its horizontal and vertical axis with respect to a solid support base;
   (b) said frame also contains guide means near the other end thereof which serve as guide for the horizontal rotation of said frame about said pivot and also allows limited vertical rotation;
   (c) at least one air cylinder interconnects said other end of said frame with said solid base to limit and control the horizontal rotation of said frame and to impart tension to said sieve; and
   (d) controlled means is provided for rotating said frame about its vertical axis through a small angle so that said conveyor roller is not parallel with the oleophilic sieve and thereby cause a shifting of the sieve along the face of the conveyor roller such that the sieve is maintained in tracking alignment on the surfaces of said conveyor roller and said apertured sidewall of said cage.

52. In a system for the continuous separation and removal of a viscous oil from a mixture of viscous oil phase and aqueous phase which comprises:
   (a) a cylindrical generally horizontal rotatable cage having an apertured continuous sidewall, said cage being mounted by axial shafts in bearings in a separation zone, said cage having inlet means for introducing a mixture of viscous oil phase and aqueous phase into the interior thereof and containing drive means to rotate said cage;
   (b) a cylindrical rotatable conveyor roller mounted in axial shafts in bearing blocks in a recovery zone;
   (c) a rotatable conveyor in the form of an apertured oleophilic endless sieve having upper and lower surfaces wherein the apertures extend from said upper to said lower surfaces and wherein said sieve is fabricated from a member selected from the group consisting of a sheet material through which said apertures have been created or a strong mesh material consisting of intersecting strands wherein said apertures are voids between said strands, said sieve being of generally uniform width support by and partially encircling the apertured continuous sidewall of said cage and the surface of said conveyor roller;
   (d) means in said separation zone around the lower portion of said cage to collect and remove aqueous phase passing through the apertures in said cage sidewall and in said olephilic sieve;
   (e) means in said recovery zone to remove viscous oil phase adhering to said sieve and collection means to recover the oil phase thus removed as a final product;
   the improvement comprising:
   (1) means for tensioning and maintaining the sieve in tracking alignment on the surface of the conveyor roller and on the apertured continuous sidewall of the cage comprising two air cylinders operated by compressed air means positioned in the recovery zone interconnecting the bearing blocks supporting the conveyor roller with a solid base, wherein the air clyinders function to allow the axis of rotation of the conveyor roller to move laterally a limited distance to provide tension to the sieve and to also rotate the axis through a small angle so as to not be parallel with the sieve and thereby cause a shifting of the sieve along the face of the conveyor roller such that the sieve is maintained in tracking alignment on the surfaces of the conveyor roller and said apertured sidewall of the cage; and
   (2) signal means positioned adjacent to the sieve to monitor the position of the siee and actuate the air cylinders to move compressed air into and out of the air cylinders to maintain the sieve in tracking alignment.

53. A system according to claim 52 wherein spring mounting is provided to one or more rollers in contact with said sieve or to said cylindrical cage thereby allowing said system to maintain relative constant sieve tension throughout minor fluctuations in sieve position without requiring activation of said air cylinders.

54. A system according to claim 52 wherein said bearing blocks are secured to a frame which frame is interconnected with said solid base by means of said air cylinders.

55. In a system for the continuous separation and removal of a viscous oil from a mixture of viscous oil phase and aqueous phase which comprises:
   (a) a cylindrical generally horizontal rotatable cage having an apertured continuous sidewall, said cage being mounted by axial shafts in bearings in a separation zone, said cage having inlet means for introducing a mixture of viscous oil phase and aqueous phase into the interior thereof and containing drive menas to rotate said cage;
   (b) a cylindrical rotatable conveyor roller mounted in axial shafts in bearing blocks in a recovery zone;

(c) a rotatable conveyor in the form of an apertured oleophilic endless sieve having upper and lower surfaces wherein the apertures extend from said upper to said lower surfaces and wherein said sieve is fabricated from a member selected from the group consisting of a sheet material through which said apertures have been created or a strong mesh material consisting of intersecting strands wherein said apertures are voids between said strands, said sieve being of generally uniform width supported by and partially encircling the apertured continuous sidewall of said cage and the surface of said conveyor roller;

(d) means in said separation zone around the lower portion of said cage to collect and remove aqueous phase passing through the apertures in said cage sidewall and in said oleophilic sieve;

(e) means in said recovery zone to remove viscous oil phase adhering to said sieve and collection means to recover the oil phase thus removed as a final product; the inprovement comprising mounting the bearing blocks to a frame wherein:

(1) the frame is supported at one end by pivot means allowing limited rotation about both its horizontal and vertical axis with respect to a solid support base;

(2) the frame also contains guide means near the other end thereof which serve as guide for the horizontal rotation of the frame about the pivot and also allows limited vertical rotation;

(3) at least one air cylinder interconnects the other end of the frame with the solid base to limit and control the horizontal rotation of the frame and to impart tension to the sieve; and (4) control means is provided for rotating the frame about its vertical axis through a small angle so that the conveyor roller is not parallel with the sieve and thereby cause a shifting of the sieve along the face of the conveyor alignment on the surfaces of the conveyor roller and the apertured sidewall of the cage.

56. A system according to claim 55 wherein spring mounting is provided to one or more rollers in contact with said sieve or to said cylindrical cage thereby allowing said system to maintain relatively constant sieve tension throughout minor fluctuations in sieve position without requiring activation of said air cylinders.

* * * * *